US012777287B2

(12) United States Patent
Zhang et al.

(10) Patent No.: US 12,777,287 B2
(45) **Date of Patent: *Oct. 27, 2026**

(54) TRANSDUCERS, LOUDSPEAKERS, AND ACOUSTIC OUTPUT DEVICES

(71) Applicant: SHENZHEN SHOKZ CO., LTD., Shenzhen (CN)

(72) Inventors: Lei Zhang, Shenzhen (CN); Guangyuan Zhu, Shenzhen (CN); Junjiang Fu, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 74 days.

This patent is subject to a terminal disclaimer.

(21) Appl. No.: 18/766,592

(22) Filed: Jul. 8, 2024

(65) Prior Publication Data

US 2024/0365049 A1 Oct. 31, 2024

Related U.S. Application Data

(63) Continuation of application No. PCT/CN2022/133224, filed on Nov. 21, 2022.

(30) Foreign Application Priority Data

Jul. 25, 2022 (CN) ......................... 202210877819.0

(51) Int. Cl.
*H04R 1/28* (2006.01)
*H04R 1/02* (2006.01)
(Continued)

(52) U.S. Cl.
CPC ............. *H04R 9/025* (2013.01); *H04R 1/025* (2013.01); *H04R 1/10* (2013.01); *H04R 1/1008* (2013.01);
(Continued)

(58) Field of Classification Search
CPC .......... H04R 9/025; H04R 1/025; H04R 1/10; H04R 1/1008; H04R 1/1075;
(Continued)

(56) References Cited

U.S. PATENT DOCUMENTS 2,136,720 A 11/1938 White
5,624,165 A 4/1997 Bluen et al.
(Continued)

FOREIGN PATENT DOCUMENTS

CN 1194766 A 9/1998
CN 202374439 U 8/2012
(Continued)

OTHER PUBLICATIONS

English machine translation of WO-2022143047-A1 (Shi et al.; Vibration Exciter; published Jul. 2022) (Year: 2022).*
(Continued)

*Primary Examiner* — Mark Fischer
(74) *Attorney, Agent, or Firm* — METIS IP LLC

(57) ABSTRACT

The present disclosure application relates to a transducer, a loudspeaker, and an acoustic output device. The transducer comprises: a magnetic circuit system including a magnet assembly and a magnetic conductive cover, the magnetic conductive cover being arranged at least partially around the magnet assembly; and a vibration plate, including a first vibration plate and a second vibration plate, the first vibration plate and the second vibration plate being respectively distributed on both sides of the magnet assembly along a vibration direction of the magnet assembly, and being configured to elastically support the magnet assembly, wherein an equivalent stiffness of the first vibration plate or the second vibration plate in any direction perpendicular to the vibration direction of the magnet assembly is greater than $4.7\times10^4$ N/m.

20 Claims, 21 Drawing Sheets

(51) Int. Cl.

| | |
|---|---|
| ***H04R 1/10*** | (2006.01) |
| ***H04R 7/04*** | (2006.01) |
| ***H04R 7/16*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ......... *H04R 1/1075* (2013.01); *H04R 1/2811* (2013.01); *H04R 7/04* (2013.01); *H04R 7/16* (2013.01); *H04R 9/041* (2013.01); *H04R 9/045* (2013.01); *H04R 9/046* (2013.01); *H04R 9/06* (2013.01); *H04R 2400/07* (2013.01); *H04R 2440/01* (2013.01); *H04R 2460/13* (2013.01)

(58) Field of Classification Search
CPC .......... H04R 1/2811; H04R 7/04; H04R 7/16; H04R 9/041; H04R 9/045; H04R 9/046; H04R 9/06; H04R 2400/07; H04R 2440/01; H04R 2460/13; H04R 2209/022; H04R 2400/11; H04R 2499/11; H04R 3/12; H04R 9/02; H04R 9/066; H04R 9/04
See application file for complete search history.

(56) References Cited

U.S. PATENT DOCUMENTS

| | | | |
|---|---|---|---|
| 5,740,265 A | 4/1998 | Shirakawa | |
| 6,628,798 B2 | 9/2003 | Teshima et al. | |
| 7,058,195 B2 | 6/2006 | Trandafir | |
| 7,324,655 B2 | 1/2008 | Sato | |
| 7,990,628 B1 * | 8/2011 | Calvet .................... | G02B 7/026 359/811 |
| 11,341,948 B2 | 5/2022 | Otto et al. | |
| 11,356,779 B2 | 6/2022 | Zhang | |
| 2004/0008101 A1 | 1/2004 | Trandafir | |
| 2004/0197005 A1 | 10/2004 | Lenhard-Backhaus et al. | |
| 2007/0232373 A1 | 10/2007 | Yoshida et al. | |
| 2007/0257083 A1 | 11/2007 | Narasimalu et al. | |
| 2008/0044044 A1 | 2/2008 | Madaffari et al. | |
| 2009/0243404 A1 | 10/2009 | Kim et al. | |
| 2016/0227326 A1 | 8/2016 | Mao et al. | |
| 2020/0336824 A1 | 10/2020 | Zheng et al. | |
| 2020/0389078 A1 | 12/2020 | Takahashi et al. | |
| 2021/0020153 A1 | 1/2021 | Reining et al. | |
| 2021/0092525 A1 | 3/2021 | Zheng et al. | |
| 2021/0281954 A1 | 9/2021 | Qi et al. | |
| 2021/0297785 A1 | 9/2021 | Zhang | |
| 2022/0150642 A1 | 5/2022 | Patsouras et al. | |
| 2022/0232326 A1 | 7/2022 | Heidinger et al. | |
| 2022/0337929 A1 | 10/2022 | Wang et al. | |
| 2023/0217155 A1 | 7/2023 | Fu et al. | |
| 2024/0365067 A1 * | 10/2024 | Zhu ........................ | H04R 9/066 |
| 2024/0397265 A1 * | 11/2024 | Zhu .......................... | H04R 9/02 |

FOREIGN PATENT DOCUMENTS

| | | | | |
|---|---|---|---|---|
| CN | 104936108 A | 9/2015 | | |
| CN | 204929243 U | 12/2015 | | |
| CN | 105472511 A | 4/2016 | | |
| CN | 205987351 U | 2/2017 | | |
| CN | 106937222 A | 7/2017 | | |
| CN | 107426647 A | 12/2017 | | |
| CN | 111464923 A | 7/2020 | | |
| CN | 111601223 A | 8/2020 | | |
| CN | 212909960 U | 4/2021 | | |
| CN | 113596648 A | 11/2021 | | |
| CN | 113873381 A | 12/2021 | | |
| CN | 114257932 A | 3/2022 | | |
| CN | 216700311 U | 6/2022 | | |
| CN | 114765715 A | 7/2022 | | |
| CN | 217985354 U | 12/2022 | | |
| EP | 1261232 A1 | 11/2002 | | |
| EP | 3125573 A1 | 2/2017 | | |
| JP | 2002152869 A | 5/2002 | | |
| JP | 2005064932 A | 3/2005 | | |
| WO | 9709859 A1 | 3/1997 | | |
| WO | 2010150953 A1 | 12/2010 | | |
| WO | 2013145227 A1 | 10/2013 | | |
| WO | 2016024693 A1 | 2/2016 | | |
| WO | WO-2016155812 A1 * | 10/2016 | ............. | H04R 11/02 |
| WO | 2020151055 A1 | 7/2020 | | |
| WO | 2021115031 A1 | 6/2021 | | |
| WO | WO-2022143047 A1 * | 7/2022 | ............... | H04R 9/06 |

OTHER PUBLICATIONS

The Notice of Reasons for Refusal in Japanese Application No. 2024-542383 mailed on Jul. 1, 2025, 7 pages.
International Search Report in PCT/CN2022/133224 mailed on Mar. 24, 2023, 7 pages.
The Extended European Search Report in European Application No. 22952820.3 mailed on Apr. 10, 2025, 6 pages.
International Search Report in PCT/CN2022/133195 mailed on Mar. 23, 2023, 7 pages.
Written Opinion in PCT/CN2022/133195 mailed on Mar. 23, 2023, 8 pages.
International Search Report in PCT/CN2022/133200 mailed on Mar. 30, 2023, 7 pages.
Written Opinion in PCT/CN2022/133200 mailed on Mar. 30, 2023, 8 pages.
International Search Report in PCT/CN2022/133220 mailed on Apr. 3, 2023, 7 pages.
Written Opinion in PCT/CN2022/133220 mailed on Apr. 3, 2023, 7 pages.
International Search Report in PCT/CN2022/133226 mailed on Apr. 4, 2023, 7 pages.
Written Opinion in PCT/CN2022/133226 mailed on Apr. 4, 2023, 8 pages.
International Search Report in PCT/CN2022/133201 mailed on Apr. 18, 2023, 6 pages.
Written Opinion in PCT/CN2022/133201 mailed on Apr. 18, 2023, 10 pages.
The Extended European Search Report in European Application No. 22952815.3 mailed on Apr. 7, 2025, 6 pages.
The Extended European Search Report in European Application No. 22952816.1 mailed on Apr. 9, 2025, 11 pages.
The Extended European Search Report in European Application No. 22952819.5 mailed on Apr. 15, 2025, 7 pages.
The Extended European Search Report in European Application No. 22952821.1 mailed on Apr. 15, 2025, 10 pages.
The Extended European Search Report in European Application No. 22952817.9 mailed on Apr. 15, 2025, 12 pages.
First Examination Report in Indian Application No. 202417051522 mailed on Feb. 18, 2026, 6 pages.

* cited by examiner

TRANSDUCERS, LOUDSPEAKERS, AND ACOUSTIC OUTPUT DEVICES

CROSS-REFERENCE TO RELATED APPLICATIONS

This application is a Continuation of International Application No. PCT/CN2022/133224, filed on Nov. 21, 2022, which claims priority to Chinese Patent Application No. 202210877819.0, filed on Jul. 25, 2022, the entire contents of each of which are hereby incorporated by reference.

TECHNICAL FIELD

The present disclosure relates to the technical field of an electronic device, particularly to transducers, loudspeakers, and acoustic output devices.

BACKGROUND

Loudspeakers are widely used in daily life. Existing loudspeakers often suffer from issues such as low sensitivity, heavy weight, magnetically biased transducers, and weak magnetic field strength. The present disclosure provides transducers, loudspeakers, and acoustic output devices that address the aforementioned problems.

SUMMARY

One of the embodiments of the present disclosure provides a transducer, comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet assembly; and a coil disposed in the magnetic circuit system, the coil is within a magnetic field range of the magnet assembly, and an overall direct current (DC) impedance of the coil is in a range of 6Ω-10Ω.

One of the embodiments of the present disclosure provides a transducer comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet assembly, a resonance peak frequency of the transducer is less than 300 Hz.

One of the embodiments of the present disclosure provides a transducer comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet assembly, an equivalent stiffness of the first vibration plate and/or the second vibration plate in any direction within a plane perpendicular to the vibration direction of the magnet assembly is greater than $4.7\times10^4$ N/m.

One of the embodiments of the present disclosure provides a transducer comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet, the magnet is provided with a first hole, and each of the magnetically conductive plates is provided with a second hole corresponding to the first hole.

One of the embodiments of the present disclosure provides a transducer comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet, a ratio of a thickness of each magnetically conductive plate to a thickness of the magnet is in a range of 0.05-0.35.

One of the embodiments of the present disclosure provides a transducer comprising: a magnetic circuit system, the magnetic circuit system including a magnet assembly and a magnetically conductive cover, the magnetically conductive cover at least partially surrounding the magnet assembly; a vibration plate, the vibration plate including a first vibration plate and a second vibration plate, the first vibration plate and the second vibration plate are respectively disposed on two sides of the magnet assembly along a vibration direction of the transducer, and the first vibration plate and the second vibration plate are configured to elastically support the magnet, at least one of the magnet, a magnetically conductive plate of the magnetically conductive plates, and the magnetically conductive cover includes multiple magnetic parts with different magnetization directions.

One of the embodiments of the present disclosure provides a loudspeaker comprising a housing, an electronic component, and a transducer according to any embodiment described in the present disclosure, the housing forms a cavity that accommodates the transducer and the electronic component.

One of the embodiments of the present disclosure provides an acoustic output device comprising a fixing assembly and a loudspeaker according to any embodiment described in the present disclosure, the fixing assembly being connected to the loudspeaker.

DETAILED DESCRIPTION

Figure 1A:
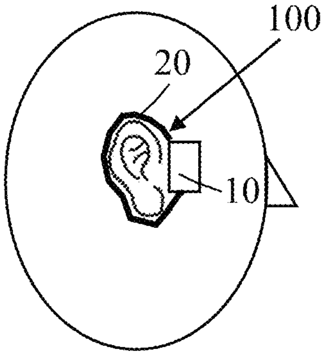
FIG. 1A is a schematic diagram illustrating wearing a loudspeaker by a user according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system," "device," "unit," and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The embodiments in the present disclosure describe an acoustic output device 100. In some embodiments, the acoustic output device 100 may include a loudspeaker 10 and a fixing assembly 20, the loudspeaker 10 is connected to the fixing assembly 20. The fixing assembly 20 may be configured to support the loudspeaker 10 to be worn at a wearing position. In some embodiments, the wearing position may be a specific position on a user's head. For example, the wearing position may include the ear, mastoid, temporal bone, parietal bone, frontal bone, etc. As another example, the wearing position may include positions on both left and right sides of the head and located on a front side of the user's ears on a sagittal axis of the human body. In some embodiments, the loudspeaker 10 may include a transducer that may be configured to convert electrical signals (containing sound information) into mechanical vibrations, allowing the user to hear sound through the acoustic output device 100. Specifically, the mechanical vibrations generated by the loudspeaker 10 may be mainly transmitted via media such as the user's skull (i.e., bone conduction) to form a bone-conducted sound, or mainly via media such as air (i.e., air conduction) to form an air-conducted sound, or may adopt a combination of the bone conduction and the air conduction to transmit sound. For more information about the loudspeaker 10, please refer to FIGS. 2A-4 and their related descriptions.

In some embodiments, the fixing assembly 20 may be arranged in a ring shape, wrapping around the user's head through their forehead and back of the head. In some embodiments, the fixing assembly 20 may be a curved rear-mounted structure adapted to the back of the user's head. In some embodiments, the fixing assembly 20 may be an ear-hook structure with a curved portion adapted to hang over the user's ear auricle. In some embodiments, the fixing assembly 20 may be a spectacle frame structure with nose pads and side temples that may be worn on the user's face and ears. For more embodiments of the fixing assembly 20, please refer to FIGS. 1A-1C and their related descriptions.

Figure 1B:
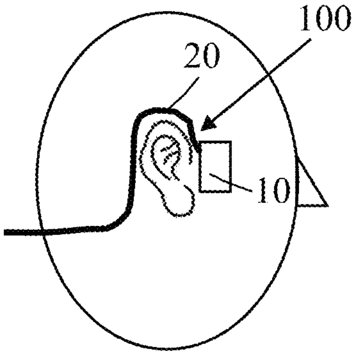
FIG. 1B is a schematic diagram illustrating wearing a loudspeaker by a user according to some embodiments of the present disclosure.
Figure 1C:
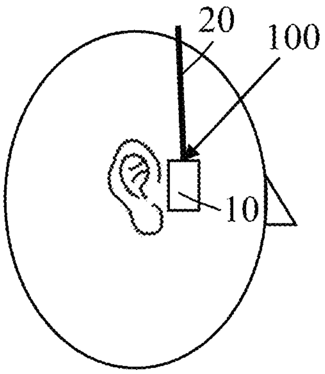
FIG. 1C is a schematic diagram illustrating wearing a loudspeaker by a user according to some embodiments of the present disclosure.

FIGS. 1A-1C are schematic diagrams illustrating wearing a loudspeaker by a user according to some embodiments of the present disclosure. In some embodiments, as shown in FIG. 1A, the fixing assembly 20 may be arranged in a ring shape, wrapping around the user's ears, so that the loudspeaker 10 is fixed to the user's face and close to the user's ear canal. In some embodiments, as shown in FIG. 1B, the fixing assembly 20 may include an ear hook and a rear-mounted structure. The ear hook and the rear-mounted structure cooperate to wrap around the back of the user's head and ear auricle, thereby fixing the loudspeaker 10 to the user's face and close to the user's ear canal. In some embodiments, as shown in FIG. 1C, the fixing assembly 20 may be a curved headbeam structure that wraps around the top of the user's head, thereby fixing the loudspeaker 10 to the user's face and close to the user's ear canal.

In some embodiments, the acoustic output device 100 may include at least two loudspeakers 10. All of the at least two loudspeakers 10 may convert electrical signals into mechanical vibrations, enabling the acoustic output device 100 to achieve stereo sound effects. For example, the acoustic output device 100 may include two loudspeakers 10. The two loudspeakers 10 may be placed on the user's left and right ear sides, respectively. In some application scenarios where stereo sound is not particularly critical (such as hearing aids for hearing-impaired patients, teleprompter use for live broadcasting, etc.), the acoustic output device 100 may also include only one loudspeaker 10.

When the acoustic output device 100 includes two loudspeakers 10, by way of an example only, the fixing assembly 20 may include two ear hook assemblies and a rear-mounted assembly. Two ends of the rear-mounted assembly are respectively connected to one end of a corresponding ear hook assembly. The other end of each ear hook assembly which is opposite the rear-mounted assembly is respectively connected to a corresponding loudspeaker 10. Specifically, the rear-mounted assembly may be curved to wrap around the back of the user's head, and the ear hook components may also be curved to hang between the user's ears and head, facilitating the wearing requirements of the acoustic output device 100. Thus, when the acoustic output device 100 is in a wearing state, the two loudspeakers 10 are located on the left and right sides of the user's head, respectively. The two loudspeakers 10, with the cooperation of the fixing assembly 20, press against the user's head, allowing the user to hear the sound output by the acoustic output device 100.

In some embodiments, the loudspeaker 10 described in the present disclosure may be a bone conduction loudspeaker and/or an air-conduction loudspeaker. In some embodiments, the acoustic output device 100 may be an electronic device with an audio functionality. For example, the acoustic output device 100 may be an electronic device such as music headphones, hearing aid headphones, bone conduction headphones, hearing aids, audio glasses, a smart helmet, a VR device, an AR device, etc.

Figure 2A:
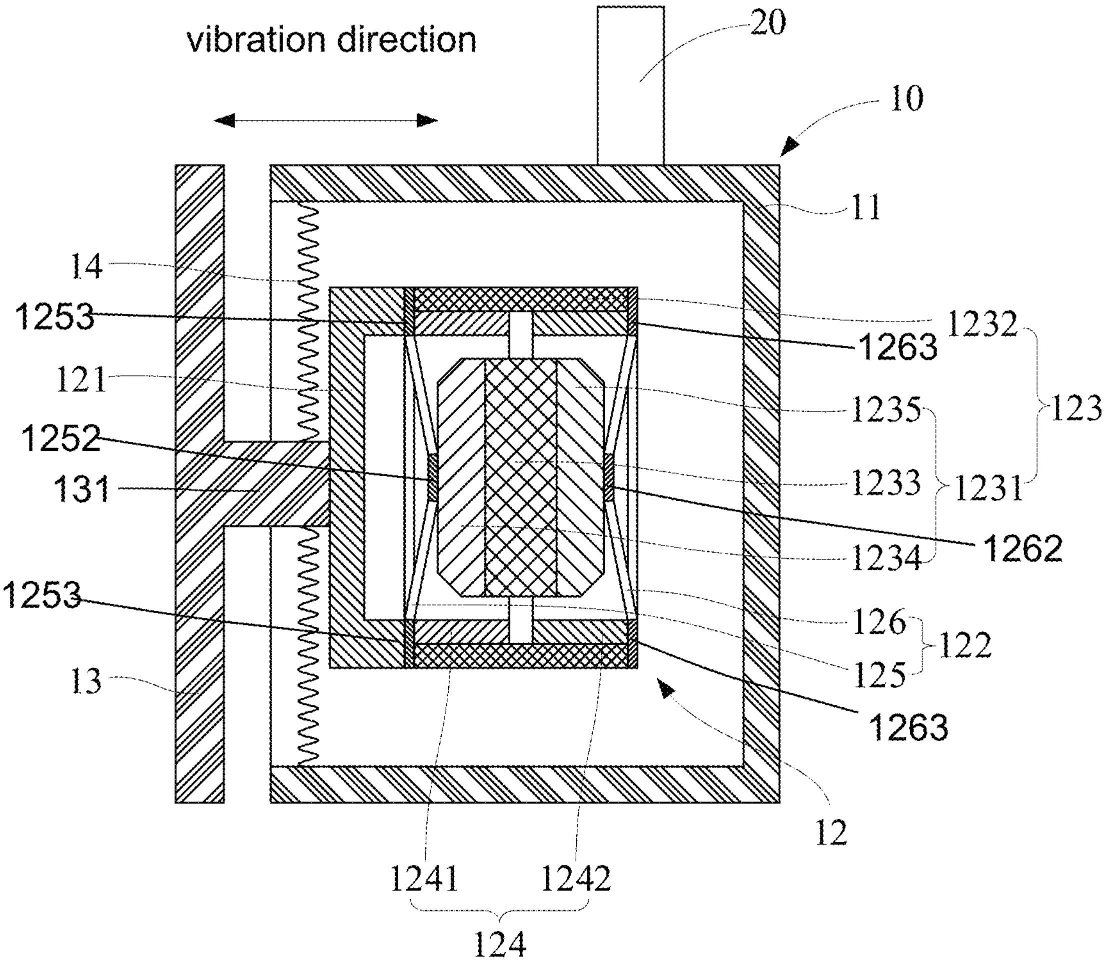
FIG. 2A is a structural diagram illustrating a loudspeaker according to some embodiments of the present disclosure.

FIG. 2A is a structural diagram illustrating a loudspeaker according to some embodiments of the present disclosure. As shown in FIG. 2A, the loudspeaker 10 may include a housing 11, a transducer 12, and a vibration panel 13. The housing 11 may form an accommodating cavity for housing the transducer 12. The transducer 12 may be disposed within the accommodating cavity of the housing 11, and the vibration panel 13 may be connected to the transducer 12 and configured to transmit the mechanical vibrations generated by the transducer 12 to the user. The fixing component 20 may be connected to an outer side of the housing 11. In some embodiments, the transducer 12 may convert electrical signals into mechanical vibrations. The vibration panel 13 may contact with the user's skin in the wearing state. The mechanical vibrations generated by the transducer 12 are transmitted to the vibration panel and act on the user's auditory nerve through the user's skin, bones, and/or tissues, thereby forming the bone-conducted sound. It should be noted that the housing 11 may be rectangular, circular, diamond-shaped, polygonal, or any irregular shape and its combinations, and is not limited to the shape shown in the figure.

In some embodiments, the loudspeaker 10 may further include a damping plate 14. The transducer 12 may be suspended within the accommodating cavity of the housing 11 via the damping plate 14. The vibration panel 13 may not contact with the housing 11. In this case, due to the presence of the damping plate 14, the mechanical vibrations generated by the transducer 12 may be less or even not transmitted to the housing 11, thereby avoiding, to some extent, the vibrations of the air outside the loudspeaker 10 caused by the housing 11. This helps reduce sound leakage from the loudspeaker 10. In some embodiments, the housing 11 may have an open end, and the vibration panel 13 is disposed outside the housing 11 and opposes the open end. In other words, an edge of the vibration panel 13 is disconnected from the open end of the housing 11. A connecting rod 131 is provided between the vibration panel 13 and the transducer 12. One end of the connecting rod 131 is connected to the transducer 12, and the other end passes through the open end of the housing 11 to connect to the vibration panel 13, so that the vibration panel 13 and the transducer 12 do not come into contact with the housing 11, thereby reducing sound leakage from the loudspeaker 10. In some embodiments, the damping plate 14 may be connected between the connecting rod 131 and the housing 11 to achieve suspensions of the vibration panel 13 and the transducer 12. In some embodiments, at least one through-hole (also known as a "sound leakage reduction hole") may be provided on the housing 11 to connect the accommodating cavity of the housing 11 with the outside of the loudspeaker 10, thereby reducing sound leakage from the loudspeaker 10.

In some embodiments, the loudspeaker 10 may also include a face pad (not shown in the figure) connected to the vibration panel 13. The face pad is configured to contact with the user's skin, meaning the vibration panel 13 may contact with the user's skin through the face pad. A Shore hardness of the face pad may be less than a Shore hardness of the vibration panel 13, which indicates that the face pad may be softer than the vibration panel 13. For example, the material of the face pad may be a soft material such as silicone, while the material of the vibration panel 13 may be a hard material such as polycarbonate or glass fiber reinforced plastic. This may improve the wearing comfort of the loudspeaker 10, make the loudspeaker 10 fit closely to the user's skin, and further enhance the sound quality of the loudspeaker 10. In some embodiments, the face pad may be detachably connected to the vibration panel 13 for easy replacement by the user. For instance, the face pad may be fitted over the vibration panel 13.

Referring to FIG. 2A, the transducer 12 may include a bracket 121, a vibration plate 122, a magnetic circuit system 123, and a coil 124. In some embodiments, the vibration panel 13 may be connected to the bracket 121. For example, as shown in FIG. 2A, the bracket 121 may be connected to an end of the connecting rod 131 away from the vibration panel 13. The bracket 121 may be connected to the magnetic circuit system 123 through the vibration plate 122, thereby suspending the magnetic circuit system 123 within the accommodating cavity of the housing 11. In some embodiments, the damping plate 14 may connect the bracket 121 and the housing 11, thereby suspending the transducer 12 within the accommodating cavity of the housing 11. The coil 124 may extend into a magnetic gap of the magnetic circuit system 123 in a vibration direction of the transducer 12.

In some embodiments, the magnetic circuit system 123 may include a magnet assembly 1231 and a magnetic conductive cover 1232. The magnetic conductive cover 1232 may be fitted over the coil 124, and the magnet assembly 1231 may be disposed inside the coil 124. The magnetic conductive cover 1232 and the magnet assembly 1231 are spaced apart in a direction perpendicular to the vibration direction, thereby forming the aforementioned magnetic gap between an inner wall of the magnetic conductive cover 1232 and an outer side of the magnet assembly 1231. In some embodiments, the coil 124 may be wounded around the outside of the magnet assembly 1231 along an axis parallel to the vibration direction of the transducer 12. In some embodiments, the magnetic conductive cover 1232 of the magnetic circuit system 123 encircles an axis parallel to the vibration direction of the transducer 12 outside the coil 124, meaning the magnetic conductive cover 1232 and the magnet assembly 1231 are spaced apart in a direction perpendicular to the vibration direction of the transducer 12. Specifically, the coil 124 may be connected to the magnetic conductive cover 1232. In some embodiments of the present disclosure, the coil 124 is attached to the inner wall of the magnetic conductive cover 1232. In some embodiments, the diaphragm 122 may be connected between the magnetic conductive cover 1232 and the magnet assembly 1231. The diaphragm 122 may be served as an elastic support for the magnet assembly 1231. For example, the vibration plate 122 and the magnetic circuit system 123 may be arranged in the vibration direction, and a side of the vibration plate 122 perpendicular to the vibration direction may be connected to an end perpendicular to the vibration direction of the magnetic conductive cover 1232, thereby achieving the fixation of the magnetic circuit system 123. It should be understood that in other embodiments of the present disclosure, a periphery of the vibration plate 122 may also be connected to the inner wall of the magnetic conductive cover 1232 or other positions, thereby achieving the fixation of the magnetic circuit system 123 relative to the magnetic conductive cover 1232.

In some embodiments, the coil 124 may include a first coil 1241 and a second coil 1242. In some embodiments, the first coil 1241 may extend into the magnetic gap of the magnetic circuit system 123 from a side closer to the vibration panel 13 in the vibration direction, and the second coil 1242 may extend into the magnetic gap of the magnetic circuit system 123 from a side farther from the vibration panel 13 in the vibration direction. In some embodiments, to simplify the assembly process, the first coil 1241 and the second coil 1242 may be inserted together into the magnetic gap of the magnetic circuit system 123 from the side closer to the vibration panel 13. In some embodiments, the transducer 12 may further include a retaining portion for maintaining the shape of the first coil 1241 and the second coil 1242. For example, the first coil 1241 and the second coil 1242 may be integrated into a single structure. Specifically, the first coil 1241 and the second coil 1242 may be wound around a shaping material, and then the retaining portion (such as high-temperature tape or other retaining materials) may be adhered to the exterior of the first coil 1241 and the second coil 1242, forming an integrated structure. The first coil 1241 and the second coil 1242, fixed on the retaining portion, extend into the magnetic gap of the magnetic circuit system 123 from the same side of the vibration panel 13, thereby simplifying the assembly process of the coil 124. In some embodiments, the two coils are wound from the same metal wire, or one segment of the two coils is connected, so that there are only two lead wires for the inlet and outlet of the two coils, facilitating wiring and subsequent electrical connections with other structures.

In some embodiments, the vibration plate 122 may include a first vibration plate 125 and a second vibration plate 126. Along the vibration direction of the transducer 12, the first vibration plate 125 and the second vibration plate 126 may elastically support the magnet assembly 1231 from opposite sides of the magnet assembly 1231. Therefore, in the embodiments described in the present disclosure, the magnet assembly 1231 is elastically supported on opposite sides in the vibration direction of the transducer 12, making it free from significant shaking or other abnormal vibrations, thus improving the stability of the vibrations of the transducer 12.

Figure 2B:
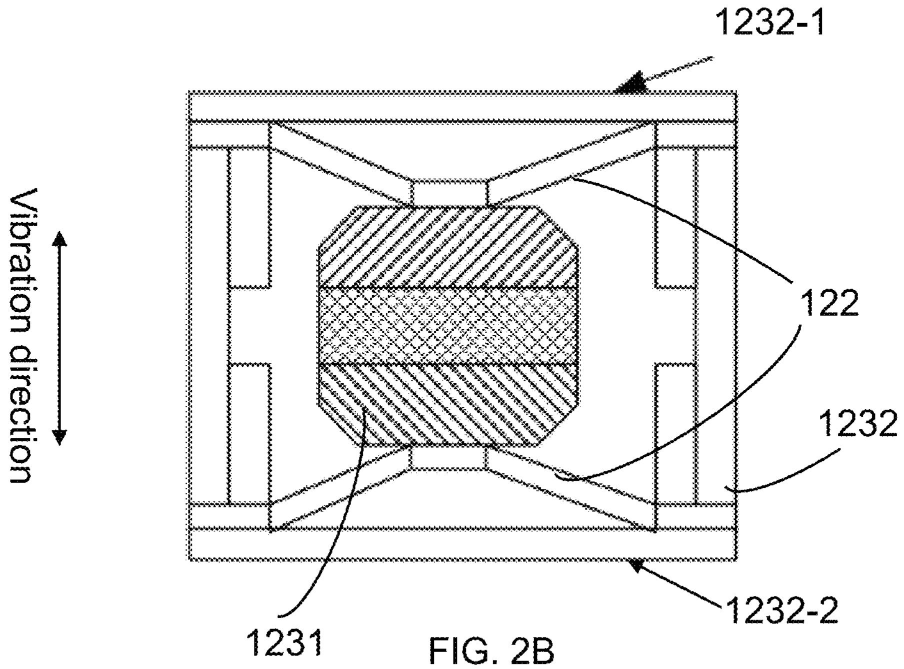
FIG. 2B is a structural diagram illustrating a magnetically conductive cover according to some embodiments of the present disclosure.
Figure 7A:
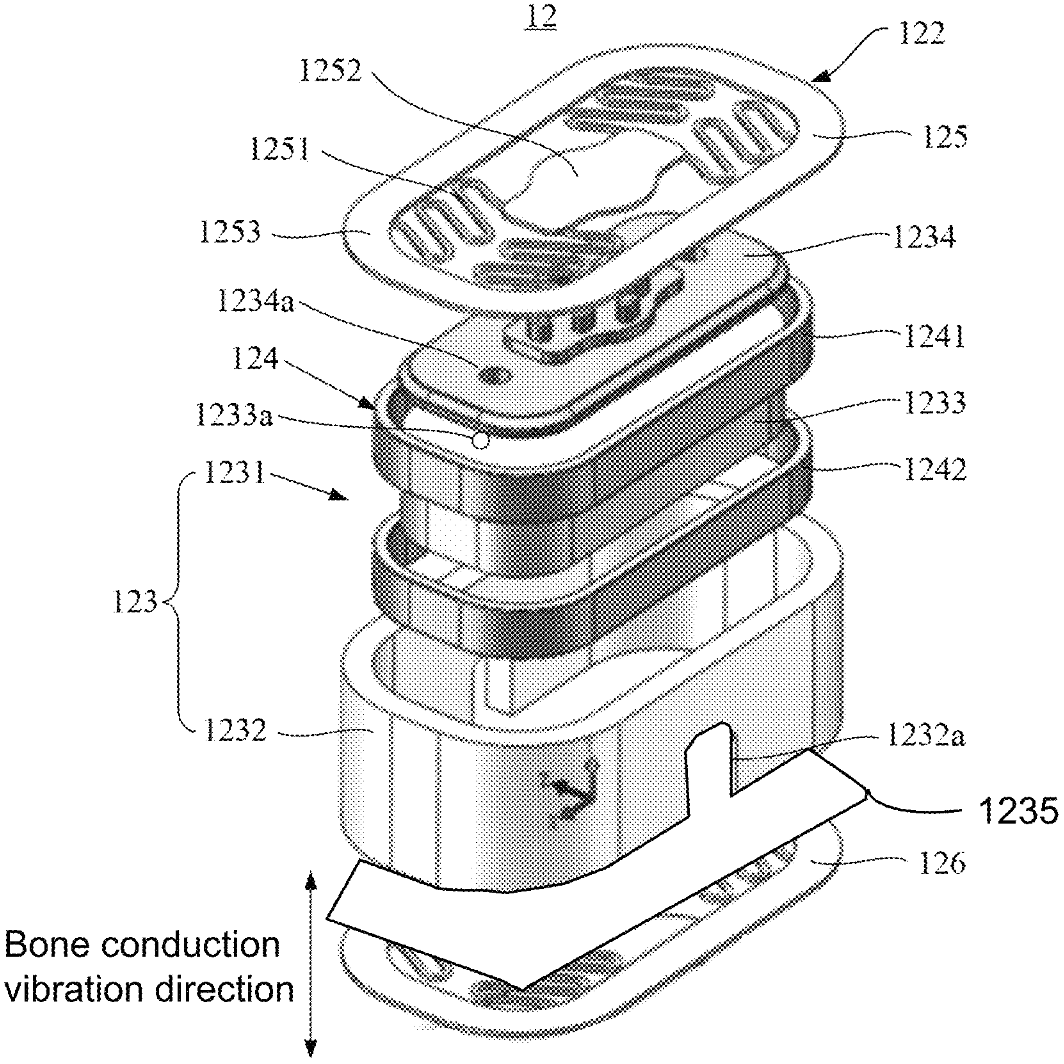
FIG. 7A is an exploded view illustrating a transducer according to some embodiments of the present disclosure.
Figure 7B:
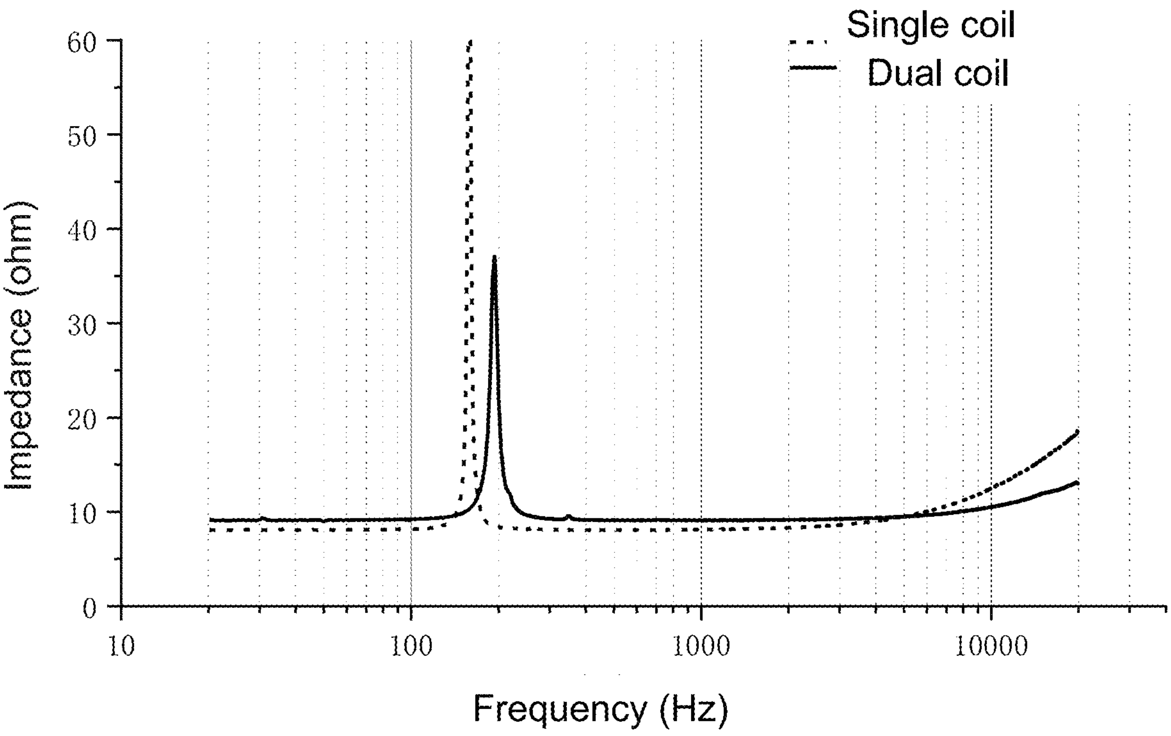
FIG. 7B is a comparison diagram illustrating impedances between transducers with single-coil and dual-coil structures according to some embodiments of the present disclosure.
Figure 7C:
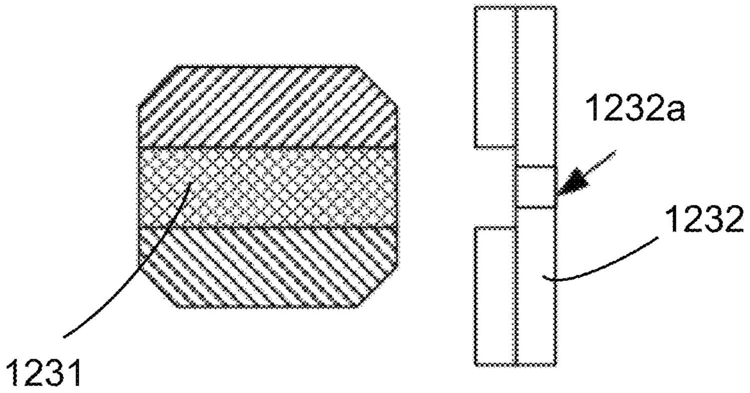
FIG. 7C is a partial schematic diagram illustrating a cylindrical magnetically conductive cover according to some embodiments of the present disclosure.
Figure 7D:
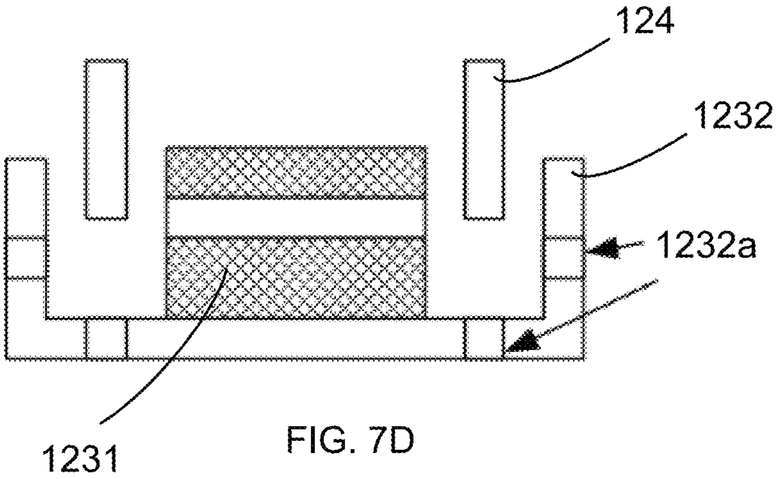
FIG. 7D is a schematic diagram illustrating a bowl-shaped magnetically conductive cover according to some embodiments of the present disclosure.

As an example, as shown in FIG. 2A, in the vibration direction, edge regions 1253 of the first vibration plate 125 are respectively connected to a side of the bracket 121 close to the magnetic circuit system 123 and a side of the magnetic conductive cover 1232 close to the bracket 121. An edge region 1263 of the second vibration plate 126 is connected to a side of the magnetic conductive cover 1232 far from the bracket 121. In some embodiments, the magnetic conductive cover 1232 may be a tubular structure with both ends open (for example, as shown in FIGS. 2A-2B), a bowl-shaped structure with one end open (for example, as shown in FIG. 7D), etc. In some embodiments, punching holes in the magnetic conductive cover 1232 (e.g., punching holes in the sidewalls of a tubular magnetic conductive cover (e.g., as shown in FIG. 7C), or punching holes in the bottom and sides of a bowl-shaped magnetic conductive cover (e.g., as shown in FIG. 7D), etc.) may reduce the acoustic chamber effect of the magnetic circuit system 123, thereby reducing sound leakage of the acoustic output device 100. In some embodiments, the magnetic conductive cover 1232 may be a closed structure, preventing sound generated in the magnetic circuit system 123 from escaping. FIG. 2B is a structural diagram illustrating the magnetic conductive cover 1232 according to some embodiments of the present disclosure. As shown in FIG. 2B, the ends of the tubular structure with both ends open may be closed by cover plates 1232-1 and 1232-2 along the vibration direction of the transducer 12 to form a closed magnetic conductive cover 1232. It should be understood that the cover plates are merely an example, and other methods (e.g., a cover film) may also be configured to close the ends of the tubular structure with both ends open along the vibration direction to form a closed magnetic conductive cover 1232. In other embodiments where the requirement for the concentration of the magnetic field generated by the magnet assembly 1231 is not very high, the magnetic conductive cover 1232 may also be replaced with a non-magnetic part such as a plastic bracket. Based on this, the edge regions of the first vibration plate 125 and the second vibration plate 126 may be respectively connected to both ends of the plastic bracket.

Figure 2C:
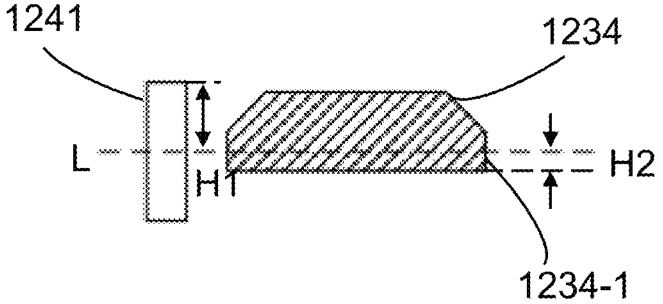
FIG. 2C is an exemplary schematic diagram illustrating a position of a first magnetically conductive plate and a position of a first coil according to some embodiments of the present disclosure.

In some embodiments, the magnet assembly 1231 may include a magnet 1233 and a magnetically conductive plate. In some embodiments, the magnet 1233 and the magnetically conductive plate are arranged along the vibration direction of the transducer 12. In some embodiments, the magnetically conductive plate may be located on one or both sides of the magnet 1233 in the vibration direction of the transducer 12. In some embodiments, the magnetically conductive plate may include a first magnetically conductive plate 1234 and a second magnetically conductive plate 1235 located on opposite sides of the magnet 1233 in the vibration direction of the transducer 12. The first vibration plate 125 may support the magnet assembly 1231 from a side of the first magnetically conductive plate 1234 facing away from the second magnetically conductive plate 1235, and the second vibration plate 126 may support the magnet assembly 1231 from a side of the second magnetically conductive plate 1235 facing away from the first magnetically conductive plate 1234. For example, a central region 1252 of the first vibration plate 125 is connected to the side of the first magnetically conductive plate 1234 facing away from the second magnetically conductive plate 1235, and a central region 1262 of the second vibration plate 126 is connected to the side of the second magnetically conductive plate 1235 facing away from the first magnetically conductive plate 1234. In some embodiments, the corners of the magnetically conductive plates (e.g., the first magnetically conductive plate 1234 and/or the second magnetically conductive plate 1235) far from the magnet 1233 may be chamfered. For example, the corners on the opposite sides of the first magnetically conductive plate 1234 and the second magnetically conductive plate 1235 (i.e., the corners far from the magnet 1233) may be chamfered to adjust the distribution of the magnetic field formed by the magnetic circuit system 123, making the magnetic field concentrated. In some embodiments, in the vibration direction of the transducer 12, a half-height of the first coil 1241 may be equal to a half-thickness of an edge line parallel to the vibration direction of the first magnetically conductive plate 1234, and a half-height of the second coil 1242 may be equal to the half-thickness of the edge line parallel to the vibration direction of the second magnetically conductive plate 1235, allowing the magnetic field to be concentrated in the rectangular portions of the first magnetically conductive plate 1234 and/or the second magnetically conductive plate 1235 other than the chamfered portions. FIG. 2C is an exemplary schematic diagram illustrating a position of the first magnetically conductive plate 1234 and a position of the first coil 1241 according to some embodiments of the present disclosure. As shown in FIG. 2C, along the vibration direction of the transducer 12, a half-height H1 of the first coil 1241 is equal to a half-thickness H2 of an edge line 1234-1 of the first magnetically conductive plate 1234 parallel to the vibration direction. Both the half-height H1 and the half-thickness H2 are located on a contour line L. In some embodiments, to simplify the manufacture of the magnetically conductive plates (e.g., the first magnetically conductive plate 1234 and/or the second magnetically conductive plate 1235), the corners of the magnetically conductive plates (e.g., the first magnetically conductive plate 1234 and/or the second magnetically conductive plate 1235) far from the magnet 1233 may be right-angled. For example, the corners on the opposite sides of the first magnetically conductive plate 1234 and the second magnetically conductive plate 1235 (i.e., the corners far from the magnet 1233) may not be chamfered. In this case, along the vibration direction of the transducer 12, the half-height of the first coil 1241 is equal to the half-thickness of the first magnetically conductive plate 1234, and the half-height of the second coil 1242 is equal to the half-thickness of the second magnetically conductive plate 1235, allowing the magnetic field to be concentrated on the first magnetically conductive plate 1234 and/or the second magnetically conductive plate 1235. Compared to the chamfered first magnetically conductive plate 1234 and second magnetically conductive plate 1235, the non-chamfered first magnetically conductive plate 1234 and the non-chamfered second magnetically conductive plate 1235 may have a small thickness, achieving the purpose of reducing the weight and volume of the entire transducer 12.

In some embodiments, the magnetic conductive cover 1232 may be connected to the bracket 121, and the bracket 121 may be connected to the housing 11 via the damping plate 14, thereby suspending the transducer 12 in the accommodation chamber of the housing 11. At this time, as shown in FIG. 2A, the edge regions 1253 of the first vibration plate 125 along the two ends perpendicular to the vibration direction may be connected to the bracket 121 and the magnetic conductive cover 1232, the edge region 1263 of the second vibration plate 126 along the two ends perpendicular to the vibration direction may be connected to the magnetic conductive cover 1232, and the vibration panel 13 may be connected to the bracket 121 and disconnected from the open end of the housing 11.

In some embodiments, if the stiffness of the damping plate 14 is too small, it is difficult for the magnetic circuit system 123 to be stably suspended within the housing 11 by the damping sheet 14, which easily leads to poor stability during the vibration of the transducer 12. Conversely, if the stiffness of the damping sheet 14 is too large, the vibration of the transducer 12 is prone to be transmitted to the housing 11 via the damping sheet 14, resulting in excessive sound leakage of the loudspeaker 10. In some embodiments, in order to achieve good stability during the vibration of the transducer 12 and reduce the sound leakage of the loudspeaker 10, a ratio between the stiffness of the damping sheet 14 and the stiffness of the first vibration plate 125 (or the second vibration plate 126) may be within a range of 0.1 to 5.

Figure 3:
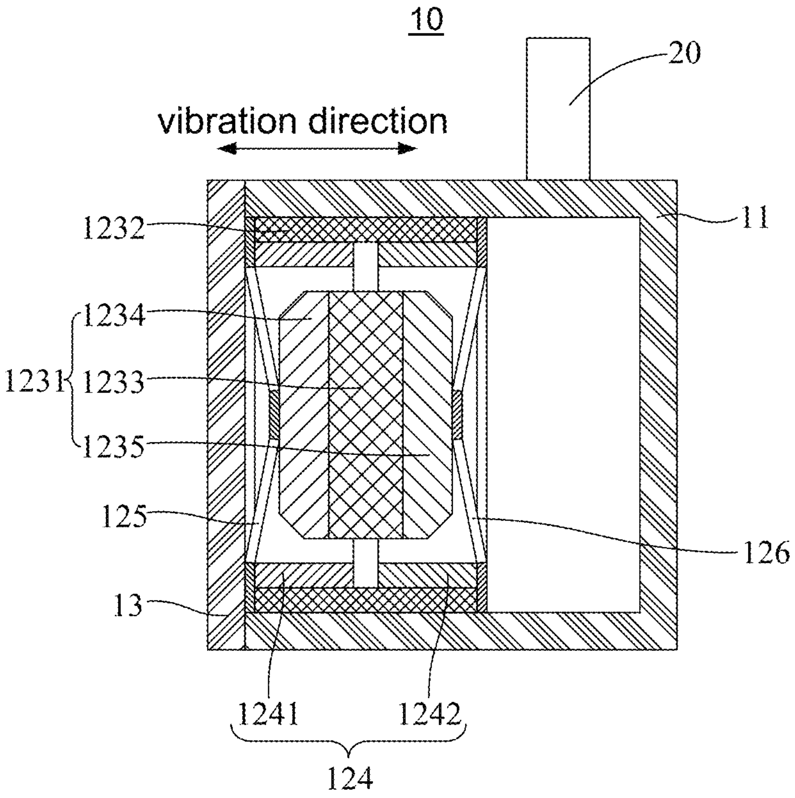
FIG. 3 is a structural diagram illustrating a loudspeaker according to some embodiments of the present disclosure.

FIG. 3 is a structural diagram illustrating the loudspeaker 10 according to some embodiments of the present disclosure. As shown in FIG. 3, the loudspeaker 10 in this embodiment is basically the same as the embodiment shown in FIG. 2A, with the main difference being that in this embodiment, the magnetic conductive cover 1232 is rigidly connected to the housing 11 or the vibration panel 13, meaning that the damping sheet 14 may not be present in this embodiment. Additionally, in this embodiment, the magnetic conductive cover 1232 is attached to the inner wall of the housing 11, fully utilizing the internal space of the housing 11, which is conducive to achieving miniaturization of the loudspeaker 10. It can be understood that in other embodiments of the present disclosure, the magnetic conductive cover 1232 may also be rigidly connected to the housing 11 or the vibration panel 13 through other fixing structures. In some embodiments, the edge regions (e.g., the edge region 1253 or the edge region 1263) of either the first vibration plate 125 or the second vibration plate 126 may be connected to the open end of the housing 11 through one or a combination of assembly methods such as clipping or gluing, and the vibration panel 13 is connected to the open end of the housing 11, thereby forming a closed cavity. In some embodiments, the side of either the first vibration plate 125 or the second vibration plate 126 that is close to the vibration panel 13 is connected to the vibration panel 13, and the vibration panel 13 is connected to the open end of the housing 11. In some embodiments, the vibration panel 13 may be made of the same material as the housing 11 and formed integrally. In some embodiments, the vibration panel 13 may be made of a different material from the housing 11 and connected through one or a combination of assembly methods such as clipping or gluing.

In some embodiments, the loudspeaker 10 may also include an electronic component. The electronic component is disposed within the accommodation cavity of the housing 11 or attached to the outer side of the housing 11. In some embodiments, the electronic component may include a vibration-sensitive component and a non-vibration-sensitive component. The vibration-sensitive component may include an air-conduction loudspeaker, an acceleration sensor, etc. The non-vibration-sensitive component may include a battery, a circuit board, etc. The battery may be configured to power the loudspeaker 10 to enable the loudspeaker 10 to operate. The circuit board may be integrated with a signal processing circuit, which is configured for signal processing of electrical signals. In some embodiments, the signal processing may include a frequency modulation processing, an amplitude modulation processing, a filtering processing, a noise reduction processing, etc. The air-conduction loudspeaker may be configured to convert electrical signals into vibration signals (sound waves), which are transmitted to the auditory nerve through the air and perceived by the user. The acceleration sensor may be configured to measure the vibration acceleration of the vibration panel 13. More information about the air-conduction loudspeaker and the acceleration sensor can be found below, for example, by referring to the descriptions of FIGS. 4-9C.

In the various embodiments shown in FIGS. 2A and 3, the loudspeaker 10 may be a bone conduction loudspeaker. The following will explain various embodiments where the acoustic output device 100 may be implemented as a bone-air-conduction loudspeaker or a bone-air conduction earphone by combining FIGS. 4-9C.

Figure 4:
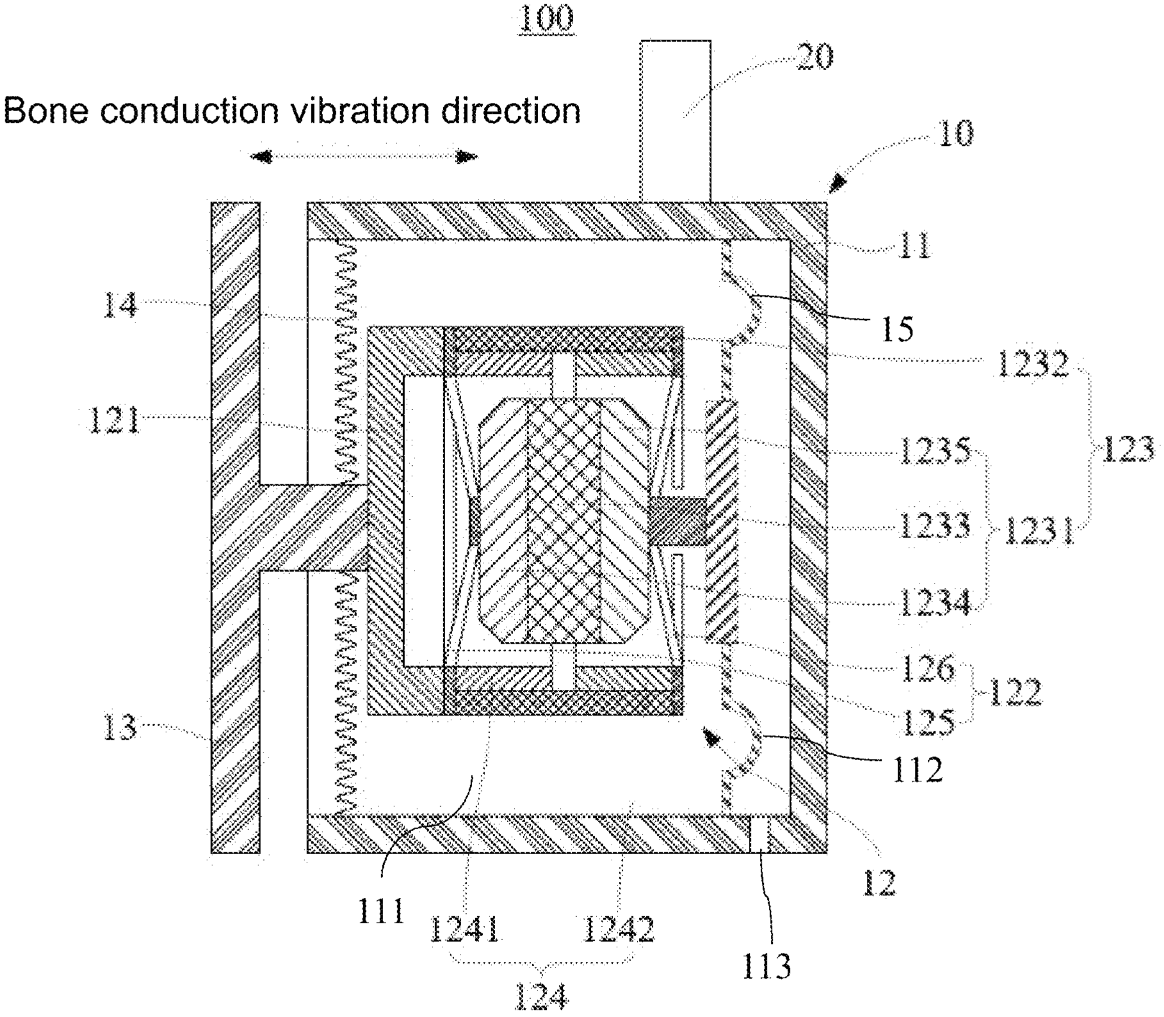
FIG. 4 is a structural diagram illustrating a loudspeaker according to some embodiments of the present disclosure.

FIG. 4 is a structural diagram illustrating the loudspeaker 10 according to some embodiments of the present disclosure. The loudspeaker 10 shown in FIG. 4 is basically the same as the loudspeaker 10 shown in FIG. 2A, with a main difference that the electronic component of the loudspeaker 10 include an air-conduction loudspeaker disposed within the accommodation cavity of the housing 11. As shown in FIG. 4, the loudspeaker 10 includes a transducer 12 and a housing 11 that accommodates the transducer 12. The transducer 12 includes a magnetic circuit system 123 (including a magnetic conductive cover 1232 and a magnet assembly 1231), a coil 124 (including a first coil 1241 and a second coil 1242), and a vibration plate 122 (including a first vibration plate 125 and a second vibration plate 126). The coil 124 is disposed in the magnetic circuit system 123, such that magnetic fields B1, B2 of the magnetic circuit system 123 pass through the coil 124. The first vibration plate 125 and the second vibration plate 126 elastically support the magnet assembly 1231. The air-conduction loudspeaker includes a diaphragm 15 connected between the magnet assembly 1231 and the housing 11, and the diaphragm 15 divides the internal space of the housing 11 (i.e., the aforementioned accommodation cavity) into a front cavity 111 close to a skin contact region (e.g., the vibration panel 13) and a rear cavity 112 far from the aforementioned skin contact region. In other words, when the user wears the loudspeaker 10, the front cavity 111 is closer to the user compared to the rear cavity 112. In some embodiments, the housing 11 is provided with a sound outlet hole 113 that is connected to the rear cavity 112, and the diaphragm 15 may generate air-conduction sound transmitted to the human ear through the sound outlet hole 113 during the relative movement between the transducer 12 and the housing 11. Thus, the sound generated in the rear cavity 112 may be transmitted through the sound outlet hole 113 and then act on a tympanic membrane of the user through the air, thereby allowing the user to hear the air-conduction sound through the loudspeaker 10.

In some embodiments, the diaphragm 15 of the air-conduction loudspeaker is connected between the magnet assembly 1231 and the housing 11 of the transducer 12, and a vibration direction of the diaphragm 15 is parallel to the vibration direction of the transducer 12. Referring to FIG. 4, when the transducer 12 moves the skin contact region towards the user's face, it may be simply regarded as bone-conduction sound enhancement. At the same time, a part of the housing 11 corresponding to the skin contact region moves towards the user's face accordingly, while the magnet assembly 1231 moves in the opposite direction due to the relationship of action and reaction, causing the air in the rear cavity 112 to be compressed. This corresponds to an increase in air pressure, resulting in an enhanced sound transmitted through the sound outlet hole 113, which may be simply regarded as air-conduction sound enhancement. Therefore, the bone-conduction sound and air-conduction sound of the loudspeaker 10 may be enhanced simultaneously, and correspondingly, when the bone-conduction sound decreases, the air-conduction sound also decreases. Based on this, the bone-conduction sound and the air-conduction sound generated by the loudspeaker 10 have the characteristic of having the same phase. Furthermore, if the front cavity 111 is a closed cavity, the front cavity 111 and the rear cavity 112 are generally separated by structural components such as the diaphragm 15 and the transducer 12, making the change pattern of air pressure in the front cavity 111 opposite to that in the rear cavity 112. In some embodiments, the housing 11 may also be provided with a pressure relief hole connected to the front cavity 111 or the front cavity 111 may be set as an open mouth to enable the front cavity 111 to communicate with the external environment, allowing air to freely enter and exit the front cavity 111. In this way, the change in air pressure in the rear cavity 112 may be minimized by the front cavity 111, thereby effectively improving the acoustic performance of the air-conduction sound produced by the loudspeaker 10. In some embodiments, the pressure relief hole set in the front cavity 111 may be staggered with the sound outlet hole 113 set in the rear cavity 112, i.e., they are not adjacent. For example, the pressure relief hole is set on one side of the housing 11, and the sound outlet hole 113 is set on the other side of the housing 11 opposite to the pressure relief hole to minimize the possibility of sound cancellation due to opposite phases.

Figure 5A:
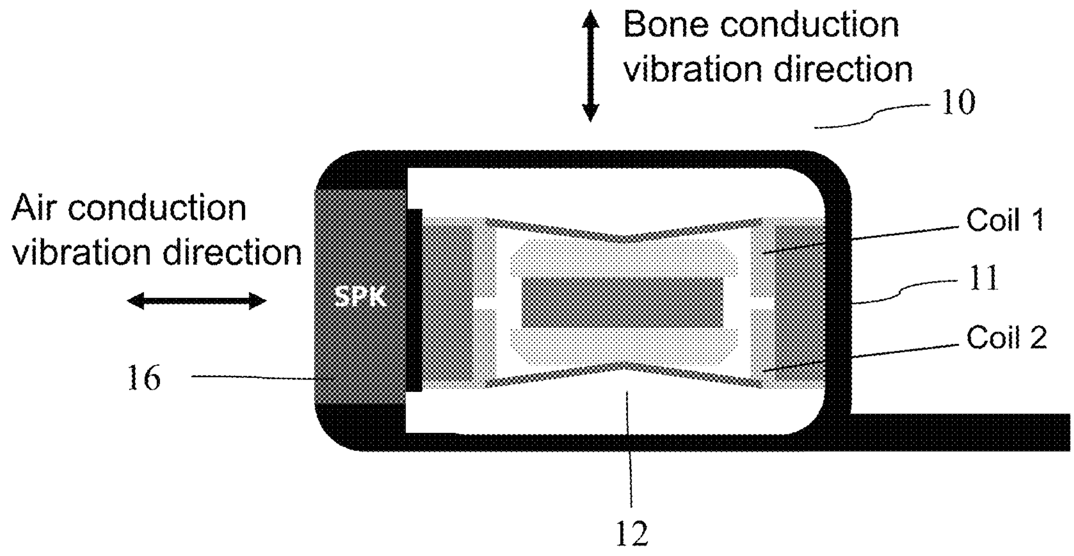
FIG. 5A is a structural diagram illustrating a loudspeaker according to some embodiments of the present disclosure.
Figure 5B:
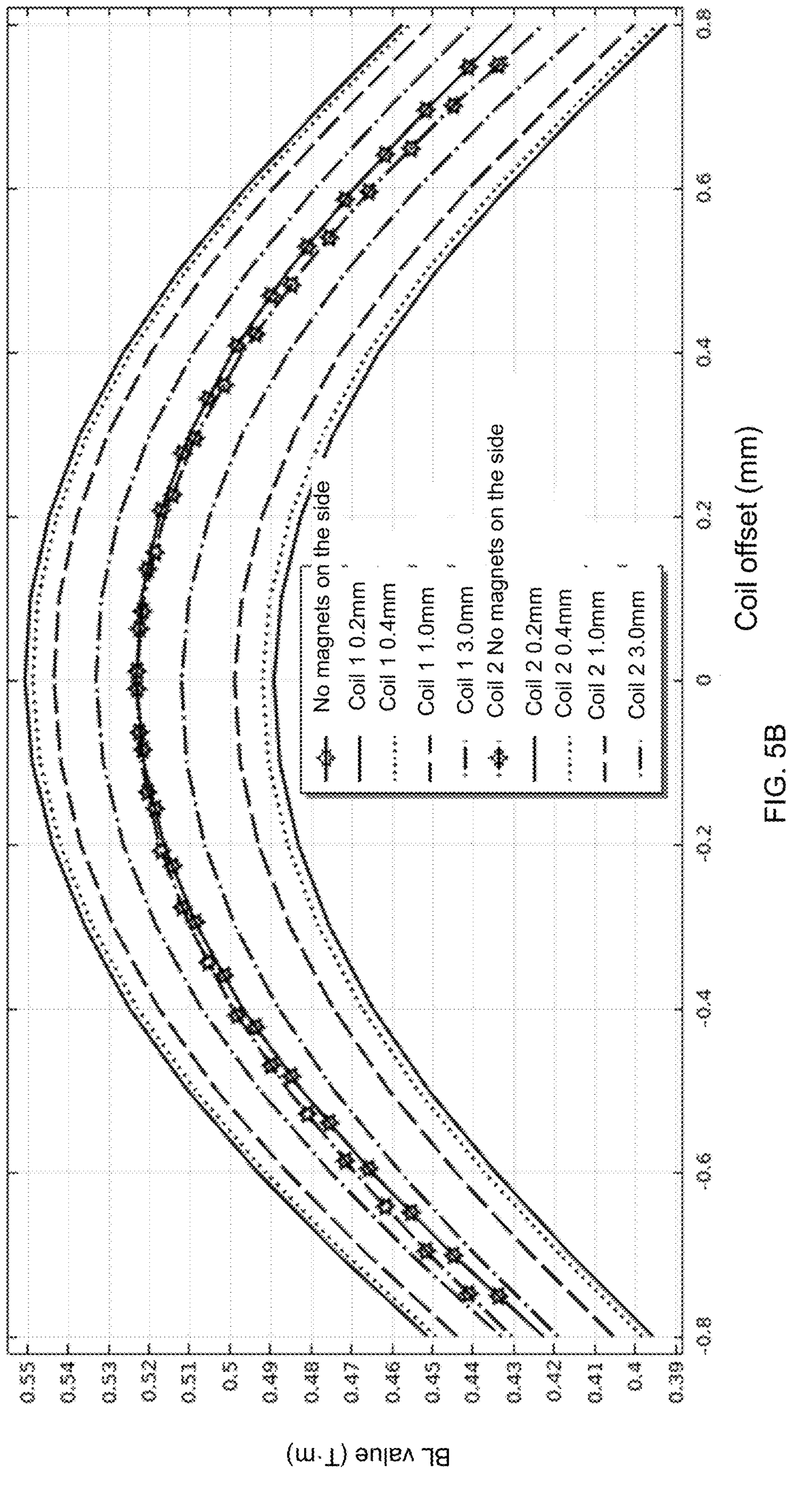
FIG. 5B is a comparison diagram illustrating an effect of different distances between a bone conduction loudspeaker and an air-conduction loudspeaker on a magnetic field of a coil according to some embodiments of the present disclosure.

In some embodiments, to prevent the air-conduction loudspeaker from resonating and producing leakage peaks due to the vibration of the transducer 12, an air-conduction vibration direction of the air-conduction loudspeaker may be different from the vibration direction of the transducer 12 (i.e., the bone-conduction vibration direction) to prevent mutual interference in the same direction. FIG. 5A is a structural diagram illustrating the loudspeaker 10 according to some embodiments of the present disclosure. As shown in FIG. 5A, an air-conduction loudspeaker 16 is set in the sidewall of the housing 11. The air-conduction loudspeaker 16 is connected to the transducer 12, and the transducer 12 and the housing 11 in the loudspeaker 10 form a bone-conduction loudspeaker. The bone-conduction loudspeaker combines with the air-conduction loudspeaker 16 to form a bone-air-conduction loudspeaker. In some embodiments, an air-conduction vibration direction of the air-conduction loudspeaker 16 is different from the vibration direction of the transducer 12 (i.e., the bone-conduction vibration direction). In some embodiments, the vibration direction of the transducer 12 may be approximately perpendicular to the air-conduction vibration direction of the air-conduction loudspeaker 16. For example, the vibration direction of the transducer 12 may be approximately perpendicular to the vibration direction of the diaphragm of the air-conduction loudspeaker 16 to reduce sound leakage of the air-conduction loudspeaker. The "approximately perpendicular" described in the present disclosure refers to an angle between the corresponding two parts within a range of 90°+20°. For example, the angle between the vibration direction of the transducer 12 and the air-conduction vibration direction (or the diaphragm of the air-conduction loudspeaker 16) is within a range of 90°+20°. For example, the vibration direction of the transducer 12 may be perpendicular to a diaphragm of the air-conduction loudspeaker 16. In some embodiments, a distance between the bone-conduction loudspeaker and the air-conduction loudspeaker 16 may be greater than a threshold distance to avoid that the electromagnetic components of the bone-conduction loudspeaker and the air-conduction loudspeaker 16 generate an electromagnetic field that affects the vibration output of both loudspeakers. The "distance between the bone-conduction loudspeaker and the air-conduction loudspeaker 16" described in the present disclosure refers to the minimum distance between the magnetic components of the bone-conduction loudspeaker and the magnetic components of the air-conduction loudspeaker 16. FIG. 5B is a comparison diagram illustrating the effect of different distances between a bone conduction loudspeaker and the air-conduction loudspeaker 16 on a magnetic field of a coil according to some embodiments of the present disclosure. As shown in FIG. 5B, when the air-conduction loudspeaker 16 is magnetized to a right side as shown in FIG. 5A, and the magnet assembly 1231 in the transducer 12 is magnetized upwards, an average magnetic field strength at the coil 1 that is located above the transducer 12 increases, while an average magnetic field strength at the coil 2 that is located below the transducer 12 decreases. With the increase in the distance between the transducer 12 of the bone-conduction loudspeaker and the air-conduction loudspeaker 16, the coils 1 and 2 tend to be in a situation without magnets on the side. Therefore, the greater the distance between the transducer 12 of the bone-conduction loudspeaker and the air-conduction loudspeaker 16 is, the smaller the impact on the magnetic field of the coils in the transducer 12 is. In some embodiments, to reduce the impact of the electromagnetic field generated between the electromagnetic components of the bone-conduction loudspeaker and the air-conduction loudspeaker 16 on the magnetic field in the coils, the distance between the bone-conduction loudspeaker and the air-conduction loudspeaker 16 may be greater than 0.3 mm. For example, the distance between the bone-conduction loudspeaker and the air-conduction loudspeaker 16 may be greater than 0.4 mm.

In some embodiments, to prevent the acceleration sensor from being affected by the vibration of the transducer 12 when measuring the acceleration of the vibrating panel 13, the vibration direction of the transducer 12 may be approximately perpendicular to the vibration-sensitive end of the acceleration sensor.

It should be noted that when the electronic component is a vibration-sensitive component such as an air-conduction loudspeaker or an acceleration sensor, the vibration direction of the vibration-sensitive component should be approximately perpendicular to the vibration direction of the transducer 12 to avoid the vibration-sensitive component being affected by the vibration of the transducer. The phrase "the vibration direction of the vibration-sensitive component is approximately perpendicular to the vibration direction of the transducer 12" mentioned in the present disclosure refers to that when the vibration-sensitive component is an air-conducted loudspeaker, the vibration direction of the transducer 12 is approximately perpendicular to the vibration direction of the diaphragm of the air-conduction loudspeaker; and when the vibration-sensitive component is an acceleration sensor, the vibration direction of the transducer 12 is approximately perpendicular to the vibration-sensitive end of the acceleration sensor. When the electronic component is a non-vibration-sensitive component such as a battery or a circuit board, the battery or circuit board may be placed at any position within the housing 11 to achieve an integrated design of the acoustic output device 100.

It can be understood that in some embodiments, the electronic component may include both the vibration-sensitive component and the non-vibration-sensitive component, and the vibration-sensitive component may be made approximately perpendicular to the vibration direction of the transducer 12. For example, in some embodiments, the electronic component include a vibration-sensitive acceleration sensor and a non-vibration-sensitive circuit board. The acceleration sensor is mounted on the circuit board and housed within the housing of the loudspeaker 10 to achieve the integration of the acoustic output device. In this case, the acceleration sensor may be made approximately perpendicular to the vibration direction of the transducer 12.

Figure 6:
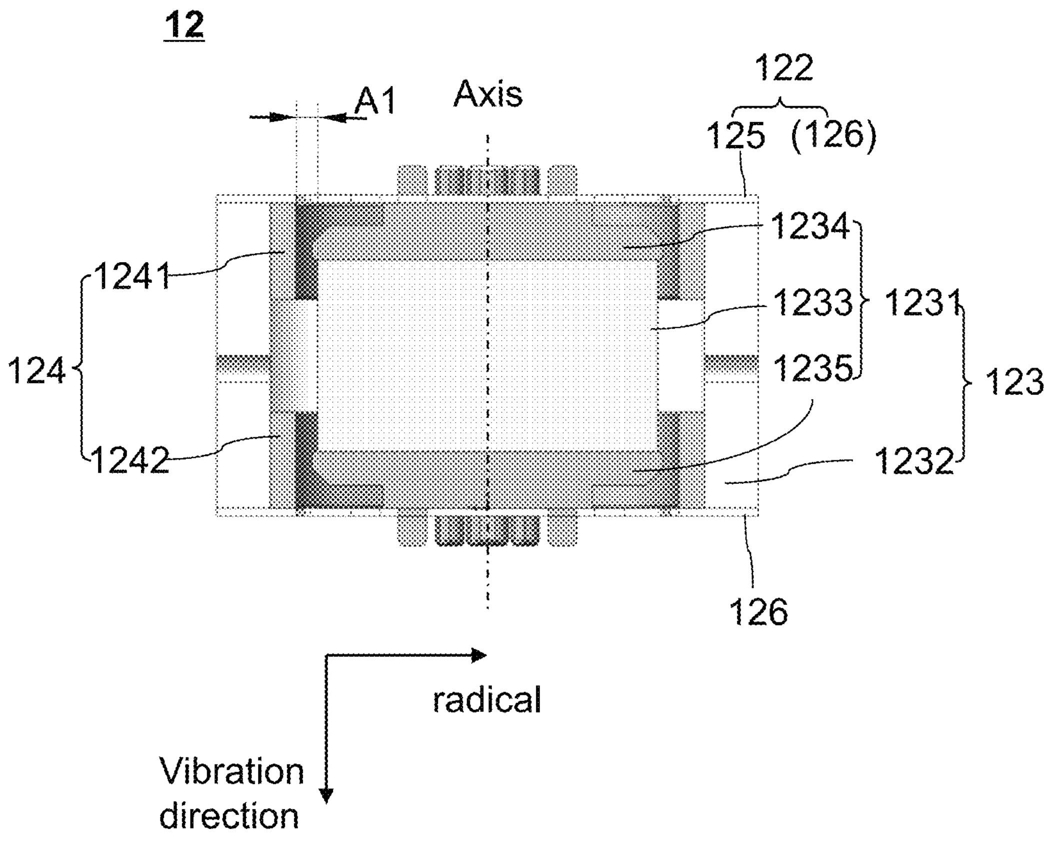
FIG. 6 is a schematic diagram illustrating a structure of a transducer according to some embodiments of the present disclosure.

FIG. 6 is a schematic diagram illustrating a structure of the transducer 12 according to some embodiments of the present disclosure. FIG. 7A is an exploded view illustrating the transducer 12 according to some embodiments of the present disclosure. The transducer 12 shown in FIGS. 6 and 7A may be used in any of the loudspeakers 10 shown in FIGS. 2A to 5A. As shown in FIGS. 6 and 7A, the transducer 12 may include a vibration plate 122, a magnetic circuit system 123, and a coil 124. The magnetic circuit system 123 may include a magnet assembly 1231 and a magnetic conductive cover 1232. The magnet assembly 1231 may include a magnet 1233, and a first magnetic plate 1234 and a second magnetic plate 1235 located on opposite sides of the magnet 1233 in the vibration direction of the transducer 12. In some embodiments, the magnetic conductive cover 1232 may be disposed around an axis outside the magnet assembly 1231. The coil 124 may be within a magnetic field range of the magnet assembly 1231. In some embodiments, the coil 124 may extend into a magnetic gap formed between the magnetic conductive cover 1232 and the magnet assembly 1231 along the vibration direction of the transducer 12, and the magnetic conductive cover 1232 is sleeved on an outer side of the coil 124. In some embodiments, an inner wall of the magnetic conductive cover 1232 may fit closely with the outer wall of the coil 124. In some embodiments, the vibration plate 122 can include a first vibration plate 125 and a second vibration plate 126. The first vibration plate 125 elastically supports the magnet assembly 1231 from a side of the first magnetic plate 1234 facing away from the second magnetic plate 1235, and the second vibration plate 126 elastically supports the magnet assembly 1231 from a side of the second magnetic plate 1235 facing away from the first magnetic plate 1234. For example, an edge region 1253 of the first vibration plate 125 is connected to one end of the magnetic conductive cover 1232 along the vibration direction of the transducer 12, and an edge region 1263 of the second vibration plate 126 is connected to the other end of the magnetic conductive cover 1232 along the vibration direction of the transducer 12.

In some embodiments, to facilitate the assembly of lead wires of the coil 124, making the inlet and outlet of the coil 124 at the same position of the magnetic conductive cover 1232, a count of coil windings along the radial direction of the transducer 12 may be even. For example, a count of radial coil windings may be 2, 4, 6, 8, etc. As shown in FIG. 6, the radial direction of the transducer 12 is a direction perpendicular to an axis (or the vibration direction) of the transducer 12.

In some embodiments, the coil 124 may include a first coil 1241 and a second coil 1242. In some embodiments, the first coil 1241 and the second coil 1242 may be arranged along the vibration direction of the transducer 12. The first coil 1241 and the second coil 1242 are connected in series or in parallel. For the first coil 1241 and the second coil 1242 connected in series or in parallel, an inlet position and an outlet position of each coil are both located at a same position of the magnetic conductive cover 1232, facilitating the assembly of the lead wires of the first coil 1241 and the second coil 1242. The inlet and outlet positions of the first coil 1241 may both be located at the same position of the magnetic conductive cover 1232, and the inlet and outlet positions of the second coil 1242 may both be located at the same position of the magnetic conductive cover 1232. For example, the inlet position of the first coil 1241, the outlet position of the first coil 1241, the inlet position of the second coil 1242, and the outlet position of the second coil 1242 may all be located at a middle position of the magnetic conductive cover 1232 (e.g., along the direction perpendicular to the vibration direction of the transducer 12, the middle of the magnetic conductive cover 1232). In some embodiments, winding directions of the first coil 1241 and the second coil 1242 may be opposite or directions of currents in the first coil 1241 and the second coil 1242 may be opposite. Under the drive of the dual coils (i.e., the coil 124 includes the first coil 1241 and the second coil 1242), the transducer 12 vibrates relatively, which may increase a vibration amplitude of the transducer 12 compared to a single voice coil. In some embodiments, the use of a dual-coil structure may achieve a lower high-frequency impedance. FIG. 7B is a comparison diagram illustrating impedance between the transducer 12 with single-coil and dual-coil structures according to some embodiments of the present disclosure. As shown in FIG. 7B, compared to the single-coil structure, the high-frequency impedance of the dual-coil is lower.

In some embodiments, excessively low impedance results in an increase in current under a same battery voltage, which not only consumes more power but also reduces battery life under the same battery capacity. On the other hand, if the battery cannot output the increased current, clipping distortion will occur. Conversely, excessively high impedance causes a decrease in current under the same battery voltage, resulting in lower sensitivity and a reduction in volume. Therefore, to balance battery life, distortion, sensitivity, and volume, the overall DC impedance of the coil 124 may be within a range of 6Ω-10Ω. In some embodiments, for the first coil 1241 and the second coil 1242 in the transducer 12, the design may be based on the following requirements:

Firstly, to ensure that the overall DC impedance of the coil 124 (consisting of the first coil 1241 and the second coil 1242) falls within a range of 6Ω-10Ω, a DC impedance range of a single coil (the first coil 1241 or the second coil 1242) may vary depending on a connection method (series or parallel). For example, to achieve an overall DC impedance of 8Ω for the coil 124, when the two coils are connected in series, the DC impedance of each individual coil (the first coil 1241 or the second coil 1242) should be 4Ω, and when the two coils are connected in parallel, the DC impedance of each individual coil should be 16Ω.

Secondly, to minimize an overall weight of the loudspeaker 10, a volume of the magnetic conductive cover 1232 and further a mass of the magnetic conductive cover 1232 may be reduced by making the inner wall of the magnetic conductive cover 1232 adhere to the outer wall of the coil 124 (including the first coil 1241 and the second coil 1242). While ensuring that the spacing between the first coil 1241 and the second coil 1242 along the vibration direction of the transducer 12 is within a range of 1.5 mm-2 mm, a shape of the coil 124 (the first coil 1241 and the second coil 1242) may be "slender" by increasing an axial height and reducing a radial width of the coil 124. This results in a corresponding reduction in an inner diameter of the magnetic conductive cover 1232, and subsequently, a reduction in the outer diameter while maintaining the thickness of the magnetic conductive cover 1232, which in turn reduces the mass of the magnetic guide cover 1232 and the overall weight of the loudspeaker 10. In some embodiments, the shape of the coil 124 (including the first coil 1241 and the second coil 1242) may be "slender" by designing parameters such as a wire diameter, radial coil windings, and axial layers of the coil 124 to meet these requirements. In some embodiments, to achieve a "slender" shape for the coil 124 (the first coil 1241 and the second coil 1242), a ratio of the axial height to the radial width of the first coil or the second coil may be no less than 3. For example, the ratio of the axial height to the radial width of the first coil or the second coil may be no less than 3.5.

Thirdly, since the axial height of the transducer 12 is primarily determined by the size of the internal magnet assembly 1231, to meet the size requirements of the transducer 12 (for example, when the acoustic output device 100 is a headset, to ensure that the height of the loudspeaker 10 in the headset is within a range of less than 5.7 mm), the axial height of a single coil (the first coil 1241 and/or the second coil 1242) may be within a range of less than 2.85 mm. For example, the axial height of a single coil (the first coil 1241 and/or the second coil 1242) may be around 2 mm.

To meet the above requirements, in some embodiments, the first coil 1241 and the second coil 1242 may be connected in series. To ensure that the overall DC impedance of the coil 124 falls within a range of 6Ω-10Ω, the DC impedance of the first coil 1241 and/or the second coil 1242 may be within a range of 4Ω±1Ω. For example, to achieve the overall DC impedance of the coil 124 within a range of 7Ω−9Ω, the DC impedance of the first coil 1241 and/or the second coil 1242 may be within a range of 3.5Ω−4.5Ω. As another example, to achieve the overall DC impedance of the coil 124 within a range of 8Ω±0.8Ω, the DC impedance of the first coil 1241 and/or the second coil 1242 may be within a range of 4Ω±0.4Ω. In some embodiments, the wire diameter of the first coil 1241 and/or the second coil 1242 may be within a range of 0.11 mm-0.13 mm.

To meet the above requirements, in some embodiments, the first coil 1241 and/or the second coil 1242 may satisfy one of the following characteristics: a wire diameter of 0.11 mm, 2 to 6 radial coil windings, and 8 to 20 axial layers; a wire diameter of 0.12 mm, 2 to 6 radial coil windings, and 9 to 20 axial layers; or a wire diameter of 0.13 mm, 2 to 6 radial coil windings, and 10 to 22 axial layers. For example, the wire diameter of the first coil 1241 and/or the second coil 1242 may be 0.11 mm, with 3 to 5 radial coil windings and 12 to 20 axial layers. As another example, the wire diameter may be 0.12 mm, with 3 to 5 radial coil windings and 14 to 20 axial layers. As a further example, the wire diameter may be 0.13 mm, with 3 to 4 radial coil windings and 15 to 22 axial layers.

In some embodiments, the relationship between the wire diameter, the radial coil windings, the axial layers, and the DC resistance of the single coils connected in series (the first coil 1241 and/or the second coil 1242) is shown in Table 1.

TABLE 1

| Wire diameter mm | Radial coil windings | Axial layers | DC resistance Ω |
|---|---|---|---|
| 0.11 | 4 | 12 | 4.00 |
| 0.11 | 4 | 13 | 4.33 |
| 0.11 | 5 | 11 | 3.66 |
| 0.12 | 4 | 14 | 3.93 |
| 0.12 | 4 | 15 | 4.21 |
| 0.13 | 4 | 17 | 4.08 |
| 0.13 | 4 | 18 | 4.32 |
| 0.13 | 4 | 16 | 3.84 |

According to Table 1, to keep the DC resistance of a single coil (the first coil 1241 or the second coil 1242) within a range of 4Ω±1Ω while maintaining an even count of radial coil windings, the exemplary wire diameter of the first coil 1241 and/or the second coil 1242 may be 0.11 mm, with 4 radial coil windings and 12 axial layers. Under this condition, the DC resistance of the first coil 1241 and/or the second coil 1242 is 4Ω. As another example, the wire diameter may be 0.12 mm, with 4 radial coil windings and 14 axial layers. In this case, the DC resistance of the first coil 1241 and/or the second coil 1242 is 3.93Ω. As a further example, the wire diameter may be 0.12 mm, with 4 radial coil windings and 15 axial layers. The DC resistance of the first coil 1241 and/or the second coil 1242 is 4Ω. Lastly, the wire diameter may be 0.13 mm, with 4 radial coil windings and 18 axial layers. In this scenario, the DC resistance of the first coil 1241 and/or the second coil 1242 is 4.08Ω.

In some embodiments, the first coil 1241 and the second coil 1242 may be connected in parallel. To ensure that the overall DC resistance of the coil 124 falls within a range of 6Ω−10Ω, the DC resistance of the first coil 1241 and/or the second coil 1242 should be within a range of 12Ω−20Ω individually. For example, to meet the requirement of the overall DC resistance of the coil 124 within a range of 8Ω±0.8Ω, the DC resistance of the first coil 1241 and/or the second coil 1242 may be within a range of 16Ω+1.6Ω. In some embodiments, the wire diameter in the first coil 1241 and the second coil 1242 may be in a range of 0.07 mm to 0.08 mm.

To meet the above requirements, in some embodiments, the radial coil windings of the first coil 1241 and/or the second coil 1242 may be 4 to 8 turns, and the axial layers may be 16 to 22 layers. For example, the radial coil windings of the first coil 1241 and/or the second coil 1242 may be 4 to 6 turns, and the axial layers may be 17 to 20 layers.

In some embodiments, to keep the DC resistance of a single coil (the first coil 1241 or the second coil 1242) within a range of 16Ω±1.6Ω while maintaining an even count of radial coil windings, Table 2 shows the wire diameter, the radial coil windings, the axial layers, and the DC resistance of exemplary parallel-connected single coils (the first coil 1241 and/or the second coil 1242). For example, the wire diameter of the parallel-connected single coils (the first coil 1241 and/or the second coil 1242) may be 0.08 mm, with 6 radial coil windings and 17 axial layers, corresponding to a DC resistance of 16.16Ω. As another example, the wire diameter may be 0.07 mm, with 4 radial coil windings and 20 axial layers, resulting in a DC resistance of 16.27Ω.

TABLE 2

| Wire diameter mm | Radial coil windings | Axial layers | DC resistance Ω |
|---|---|---|---|
| 0.08 | 6 | 17 | 16.16 |
| 0.07 | 4 | 20 | 16.27 |

In some embodiments, as shown in FIG. 4 or FIG. 6, the coil 124 is wound around an axis parallel to the vibration direction and is positioned outside the magnet assembly 1231, while the magnetic conductor cover 1232 is wound around the axis and positioned outside the coil 124. There is a magnetic gap A1 between the coil 124 and the magnet assembly 1231. Specifically, the magnetic gap A1 refers to a gap formed between the inner wall of the coil 124 and the outer wall of the magnet 1233 in the magnet assembly 1231. An excessively large magnetic gap A1 may reduce the magnetic field strength, while an excessively small magnetic gap A1 may make a processing process thereof difficult. Therefore, in some embodiments, to balance both magnetic field strength and processability, a radial width of the magnetic gap A1 may be within a range of 0.25 mm to 0.35 mm. For example, the magnetic gap A1 may be within a range of 0.27 mm to 0.33 mm. As another example, the magnetic gap A1 may be within a range of 0.29 mm to 0.31 mm. Yet another example is that the magnetic gap A1 between the coil 124 and the magnet assembly 1231 may be 0.3 mm. In some embodiments, after selecting an appropriately sized magnet 1233 while satisfying the width requirement of the magnetic gap A1, a radial elasticity of the vibration plate (such as the first vibration plate 125 and the second vibration plate 126) may be designed to meet the conditions required to resist the attractive force of the magnet 1233.

In some embodiments, to avoid reducing the magnetic field strength due to magnetic saturation of the magnetic conductor cover 1232, the thickness of the magnetic conductor cover 1232 in the radial direction of the transducer 12 cannot be too thin. In some embodiments, the thickness of the magnetic conductor cover 1232 in the radial direction of the transducer 12 may be no less than 0.3 mm. However, an excessively thick magnetic conductor cover 1232 may increase the thickness of the transducer 12, so the thickness of the magnetic conductor cover 1232 cannot be too thick. Therefore, considering both weight reduction and avoidance of magnetic saturation, the thickness of the magnetic conductor cover 1232 in the radial direction of the transducer may be within a range of 0.3 mm to 1 mm. For example, the thickness of the magnetic conductor cover 1232 may be within a range of 0.4 mm to 0.9 mm. As another example, the thickness of the magnetic conductor cover 1232 may be within a range of 0.5 mm to 0.8 mm. In some embodiments, as shown in FIG. 7A, to further reduce the mass of the transducer 12 (and thus the mass of the loudspeaker 10), the magnetic conductor cover 1232 may have a weight-reducing structure 1232*a*. The weight-reducing structure 1232*a* may include a weight-reducing slot or hole opened in the magnetic conductor cover 1232. The weight-reducing slot or hole may be of any shape or configuration. For example, the weight-reducing slot may be a through-slot or recesses with any cross-section in the magnetic conductor cover 1232. As another example, the weight-reducing slot may be a circular groove opened on the inner wall of the magnetic conductor cover 1232. In some embodiments, the weight-reducing slot may be a rectangular through-slot that penetrate the sidewalls of the magnetic conductor cover 1232 and extend to one end face of the magnetic conductor cover 1232 along the vibration direction. FIG. 7C is a partial schematic diagram illustrating the cylindrical magnetically conductive cover 1232 according to some embodiments of the present disclosure; FIG. 7D is a schematic diagram illustrating the bowl-shaped magnetically conductive cover 1232 according to some embodiments of the present disclosure. As shown in FIG. 7C, the weight-reducing structure 1232*a* may include a weight-reducing hole opened on the sidewalls of the cylindrical magnetic conductor cover 1232. As shown in FIG. 7D, the weight-reducing structure 1232*a* may include a weight-reducing hole opened on the sidewalls and/or bottom of the bowl-shaped magnetic conductor cover 1232.

Figure 8:
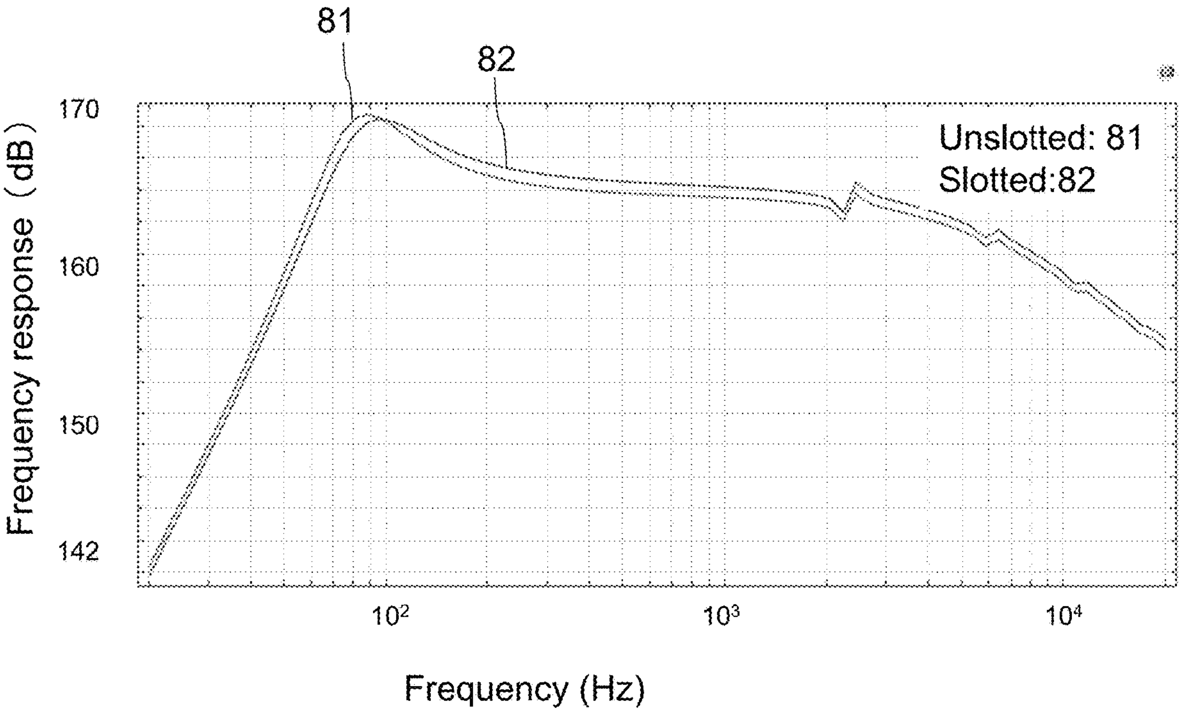
FIG. 8 is a comparison diagram illustrating frequency response curves when a magnetically conductive cover is slotted and unslotted.

FIG. 8 is a comparison diagram illustrating frequency response curves when the magnetically conductive cover 1232 is slotted and unslotted. As shown in FIG. 8, the horizontal axis represents frequency (Hz), the vertical axis represents frequency response (dB), curve 81 represents the frequency response curve of the transducer 12 without slots, and curve 82 represents the frequency response curve of the transducer 12 with slots. As shown in FIG. 8, the frequency corresponding to the resonance peak of curve 82 is higher than that of curve 81. Therefore, after slotting, the mass of the magnetic conductor cover 1232 decreases, reducing the mass of the transducer 12, which in turn increases the resonance frequency of the transducer 12. At the same time, after the resonance frequency (around 100 Hz), the frequency response of the transducer 12 with slots is greater than that of the transducer 12 without slots at the same frequency, enhancing the sound quality of the transducer 12.

In some embodiments, an outer diameter shape of the magnetic conductor cover 1232 may be rectangular, elliptical, circular, racetrack-shaped, polygonal, etc. For example, as shown in FIG. 7A, the outer diameter shape of the magnetic conductor cover 1232 may be racetrack-shaped, with a length of the corresponding equivalent rectangle being less than 20 mm and a width being less than 12 mm. As another example, the length and width of the equivalent rectangle corresponding to the magnetic conductor cover 1232 are 18.1 mm and 10.1 mm, respectively. The racetrack shape mentioned in the present disclosure usually refers to a closed loop formed by connecting the two ends of two arcs with the two ends of two straight lines. For example, the racetrack shape may also be a rounded rectangle, which replaces all four right angles of a rectangle with rounded corners. The length/width of the equivalent rectangle refers to the length/width of the rectangle corresponding to the racetrack shape (e.g., the shape obtained by replacing the four rounded corners of the racetrack shape with right angles).

In some embodiments, the magnet assembly 1231 may include a magnet 1233 and a magnetic conductor plate disposed on one side of the magnet 1233 in the vibration direction of the transducer 12. When the magnetic conductor plate is too thin, it is prone to magnetic saturation, and the magnetic field strength at the coil position decreases accordingly. However, when the magnetic conductor plate is too thick, due to the limitation of the overall volume of the magnet assembly 1231, if the magnetic conductor plate is too thick, it may easily lead to the magnet 1233 being too thin, resulting in a low magnetic field strength. Therefore, to increase the magnetic field strength and avoid magnetic saturation, a ratio of the thickness of the magnetic conductor plate to the thickness of the magnet 1233 may be within a range of 0.05 to 0.35. For example, the ratio of the thickness of the magnetic conductor plate to the thickness of the magnet 1233 may be within a range of 0.15 to 0.3. In some embodiments, the magnetic conductor plate may include a first magnetic conductor plate 1234 and a second magnetic conductor plate 1235. The first magnetic conductor plate 1234 is located on one side of the magnet 1233 in the vibration direction of the transducer 12, and the second magnetic conductor plate 1235 is located on the other side of the magnet 1233 in the vibration direction of the transducer 12. The ratio of the thickness of the first magnetic conductor plate 1234 or the second magnetic conductor plate 1235 (hereinafter referred to as the magnetic conductor plate) to the thickness of the magnet 1233 is within a range of 0.05 to 0.35. In some embodiments, to increase the magnetic field strength and avoid magnetic saturation, the thickness of the magnetic conductor plate (the first magnetic conductor plate 1234 or the second magnetic conductor plate 1235) may be within a range of 0.5 mm to 1 mm. For example, the thickness of the magnetic conductor plate (the first magnetic conductor plate 1234 or the second magnetic conductor plate 1235) may be within a range of 0.6 mm to 0.7 mm.

In some embodiments, to facilitate the assembly and positioning of the magnet 1233 with the magnetic conductive plate (the first magnetic conductive plate 1234 and/or the second magnetic conductive plate 1235), and to reduce the mass of the transducer 12 (further reducing the overall mass of the acoustic output device 100), holes may be drilled on the magnet 1233 and/or the magnetic conductive plate (the first magnetic conductive plate 1234 and/or the second magnetic conductive plate 1235). For example, as shown in FIG. 7A, the magnet 1233 is provided with a first hole 1233*a*, and the magnetic conductive plate is provided with a second hole 1234*a*, which may be positioned correspondingly with the first hole 1233*a* to facilitate the assembly and positioning of the magnet 1233 with the magnetic conductive plate (the first magnetic conductive plate 1234 and/or the second magnetic conductive plate 1235).

Figure 9A:
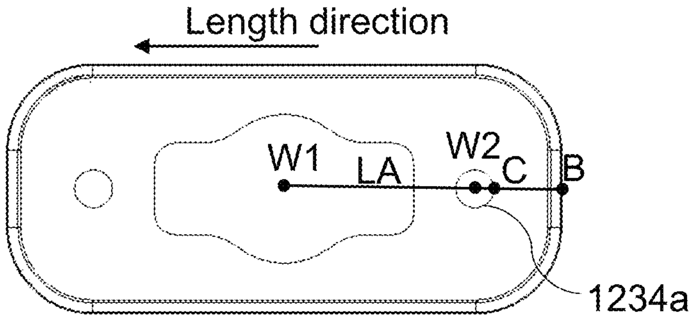
FIG. 9A is a top view illustrating a magnetically conductive plate according to some embodiments of the present disclosure.
Figure 9B:
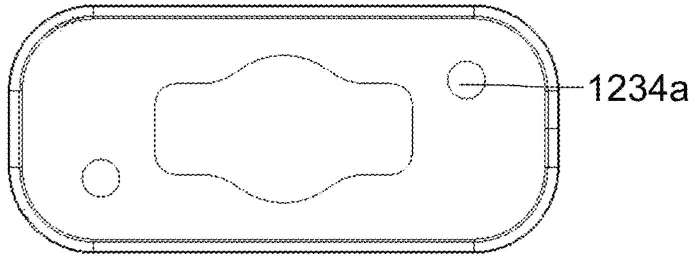
FIG. 9B is a top view illustrating a magnetically conductive plate according to some embodiments of the present disclosure.
Figure 9C:
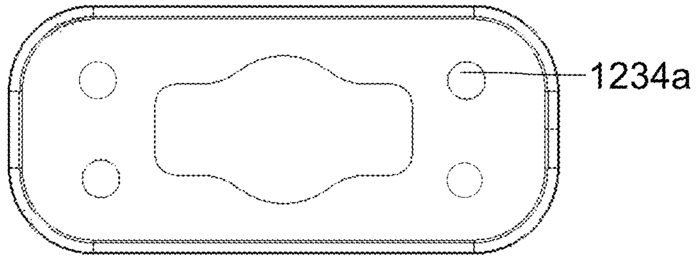
FIG. 9C is a top view illustrating a magnetically conductive plate according to some embodiments of the present disclosure.

In some embodiments, to improve the accuracy of assembly, a count of second holes 1234*a* on the magnetic conductive plate may be at least two. Correspondingly, a count of first holes 1233*a* on the magnet 1233 may also be at least two, each corresponding to a second hole 1234*a*. FIGS. 9A to 9C are top views illustrating the magnetically conductive plate according to some embodiments of the present disclosure. As shown in FIG. 9A, the magnetic conductive plate is in a rounded rectangular structure, and two second holes 1234*a* are set along a length direction of the magnetic conductive plate (as shown in FIG. 9A). In some embodiments, the two second holes 1234*a* are set on the midline along the length direction of the magnetic conductive plate. As shown in FIG. 9B, the magnetic conductive plate is in a rounded rectangular structure, and two second holes 1234*a* are set along a diagonal direction of the magnetic conductive plate. As shown in FIG. 9C, the magnetic conductive plate is in a rounded rectangular structure, and second holes 1234*a* are set near each of the four rounded corners.

Figure 10:
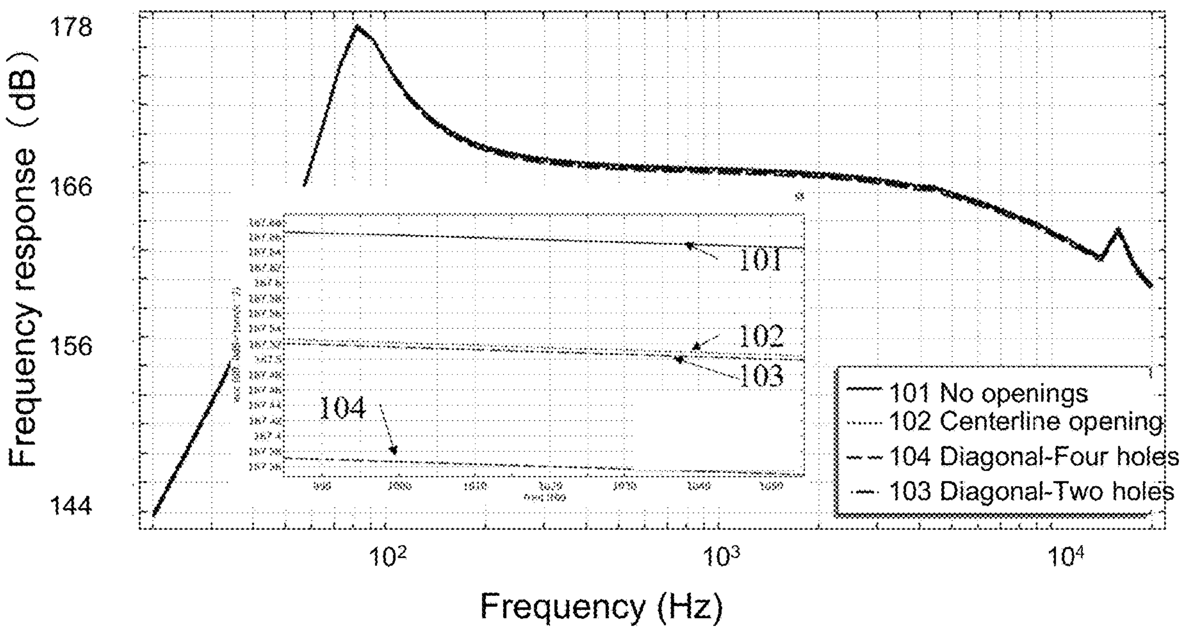
FIG. 10 is a comparison diagram illustrating frequency response curves when a magnetically conductive plate is perforated and unperforated according to some embodiments of the present disclosure.
Figure 11:
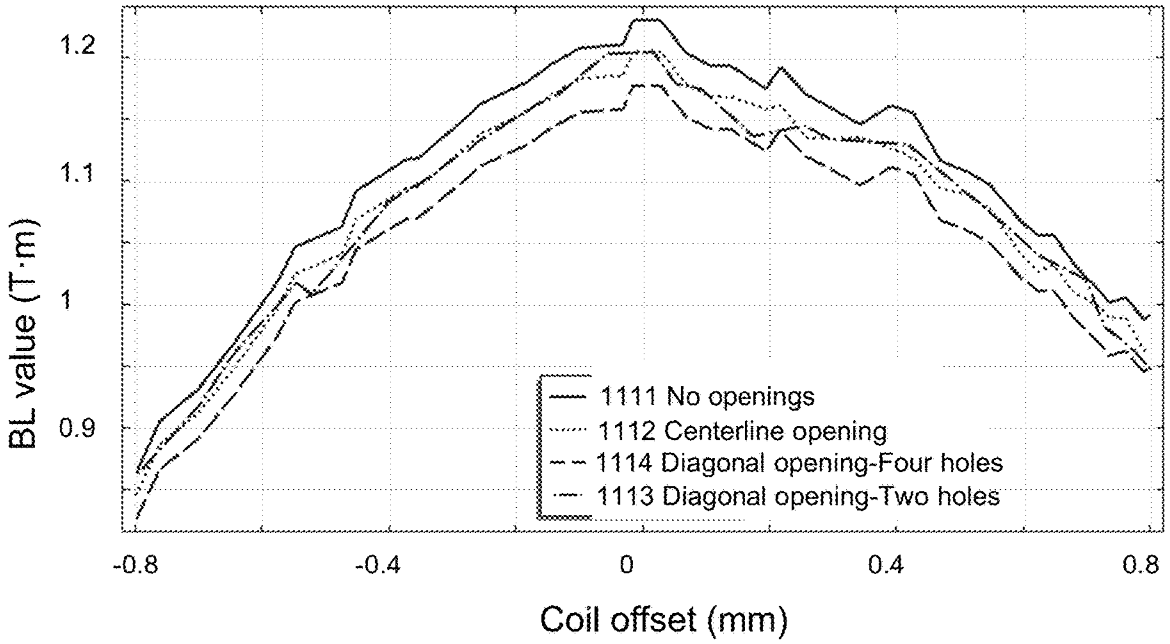
FIG. 11 is a comparison diagram illustrating frequency response curves when a magnetically conductive plate is perforated and unperforated according to some embodiments of the present disclosure.

FIG. 10 is a comparison diagram illustrating frequency response curves when a magnetically conductive plate is perforated and unperforated according to some embodiments of the present disclosure. FIG. 11 is a comparison diagram illustrating frequency response curves when a magnetically conductive plate is perforated and unperforated according to some embodiments of the present disclosure. In FIG. 10, curve 101 is the frequency response curve without holes on the magnetic conductive plate, curve 102 is the frequency response curve with two holes set along the midline in the length direction of the magnetic conductive plate (as shown in FIG. 9A), curve 103 is the frequency response curve with two holes set along the diagonal of the magnetic conductive plate (as shown in FIG. 9B), and curve 104 is the frequency response curve with four holes set along the diagonal of the magnetic conductive plate (as shown in FIG. 9C). As shown in FIG. 10, comparing curves 102 and 103, it can be seen that the frequency response curves are almost identical when two holes are set along the midline in the length direction and when two holes are set along the diagonal; comparing curves 103 and 104, it can be seen that with the increase in the number of holes set on the diagonal, the frequency response slightly decreases, but a decrease value is almost within a range of 0.5 dB. Comparing curve 101 with other curves (curve 102 or 103 or 104), it can be seen that compared to not drilling holes on the magnetic conductive plate, the frequency response slightly decreases, but the decrease value is almost within a range of 0.5 dB, so the impact of drilling holes on the frequency response is not significant. However, from the perspective of reducing weight and facilitating assembly and positioning, drilling holes reduces the mass of the transducer 12 and facilitates the assembly and positioning of the magnet 1233 with the magnetic conductive plate (the first magnetic conductive plate 1234 and/or the second magnetic conductive plate 1235).

In FIG. 11, curve 1111 is a BL value curve without holes on the magnetic conductive plate, curve 1112 is a BL value curve with two holes set along the midline in the length direction of the magnetic conductive plate (as shown in FIG. 9A), curve 1113 is a BL value curve with two holes set along the diagonal of the magnetic conductive plate (as shown in FIG. 9B), and curve 1114 is a BL value curve with four holes set along the diagonal of the magnetic conductive plate (as shown in FIG. 9C). The BL value reflects electromagnetic characteristics, referring to a product of a magnetic field strength and a length of a coil wire. As shown in FIG. 11, comparing curves 1112 and 1113, it can be seen that the BL value curves are almost identical when two holes are set along the midline in the length direction and when two holes are set along the diagonal; comparing curves 1113 and 1114, it can be seen that with the increase in the number of holes set on the diagonal, the BL value slightly decreases. Comparing curve 1111 with other curves (curve 1112 or 1113 or 1114), it can be seen that compared to not drilling holes on the magnetic conductive plate, the BL value slightly decreases, but the decrease value is almost within a range of 0.05 T·m, so the impact of drilling holes on the BL value is not significant. However, from the perspective of reducing weight and facilitating assembly and positioning, drilling holes reduces the mass of the transducer 12 and facilitates the assembly and positioning of the magnet 1233 with the magnetic conductive plate (the first magnetic conductive plate 1234 and/or the second magnetic conductive plate 1235).

Figure 12:
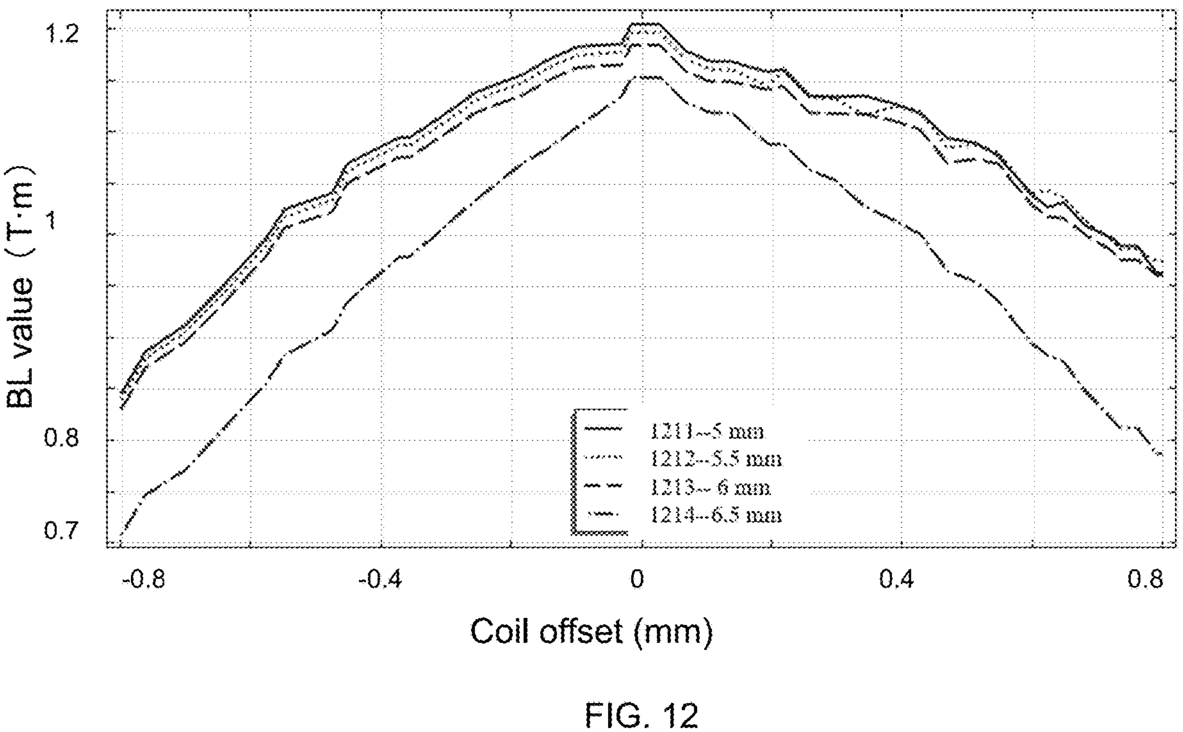
FIG. 12 is a comparison diagram illustrating BL value curves when a second hole on a magnetically conductive plate is at different distances from a center of the magnetically conductive plate according to some embodiments of the present disclosure.

In some embodiments, the position of the second hole 1234*a* on the magnetic conductor plate has a significant impact on the BL value of the transducer 12. Taking the example of two second holes 1234*a* placed on the midline of the magnetic conductor plate along its length, FIG. 12 compares the BL value curves when a distance between the second hole and a center of the magnetic conductor plate varies. As shown in FIG. 12, curve 1211 represents a BL value curve when the second hole 1234*a* is 5 mm away from the center of the magnetic conductor plate, curve 1212 represents a BL value curve when the distance is 5.5 mm, curve 1213 represents a BL value curve when the distance is 6 mm, and curve 1214 represents a BL value curve when the distance is 6.5 mm. Under a same coil offset (for example, 0 mm), curves 1211, 1212, 1213, and 1214 decrease sequentially, with curve 1214 being significantly lower than the other three curves. The center of the magnetic conductor plate refers to its geometric center. As can be seen from FIG. 12, the further the second hole 1234*a* is from the center of the magnetic conductor plate is, tending towards the edge, the more significant the decrease in the BL value of the transducer 12 is. Therefore, the second hole 1234*a* should be set as far as possible from the edge of the magnetic conductor plate. It should be noted that the distance between the second hole 1234*a* and the center of the magnetic conductor plate refers to the distance between the center of the second hole and a geometric center of the magnetic conductor plate. In some embodiments, to increase the BL value of the transducer 12, a ratio of an opening area of the second hole 1234*a* to an area of the magnetic conductor plate surface where the second hole is located is less than 36%, with no limitation on the shape and position of the opening. It should be noted that a distance between an edge of the second hole 1234*a* and an edge of the magnetic conductor plate is shown in FIG. 9A. A straight line LA is formed by extending the line connecting the center W2 of the second hole 1234*a* and the geometric center W1 of the magnetic conductor plate towards the edge of the magnetic conductor plate. Point B is the intersection of line LA and the edge of the magnetic conductor plate, while point C is the intersection of line LA and the edge of the second hole 1234*a* near point B. The distance between the edge of the second hole 1234*a* and the edge of the magnetic conductor plate refers to the distance between points B and C on line LA. In some embodiments, the distance between the edge of the second hole 1234*a* and the edge of the magnetic conductor plate can be greater than 0.2 mm, which may prevent the second hole from being too close to the edge and reducing structural strength. At the same time, it may also reduce the impact of the second hole on magnetic field strength, ensuring that the loudspeaker sensitivity does not decrease significantly.

Figure 13:
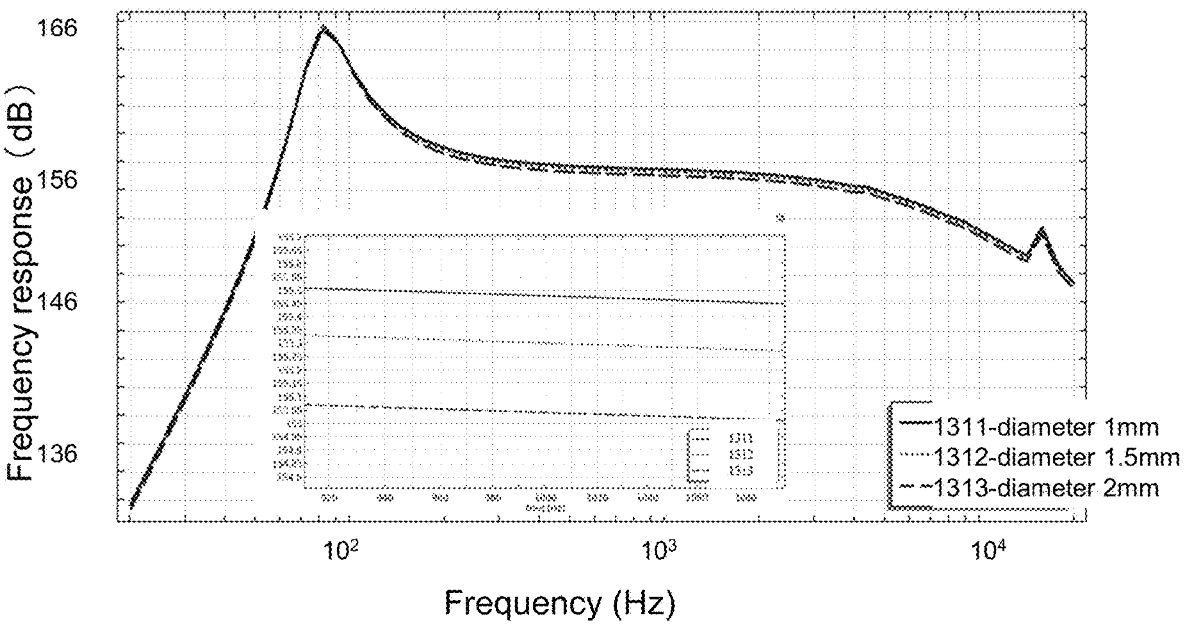
FIG. 13 is a comparison diagram illustrating frequency response curves when a second hole has different diameters according to some embodiments of the present disclosure.
Figure 14A:
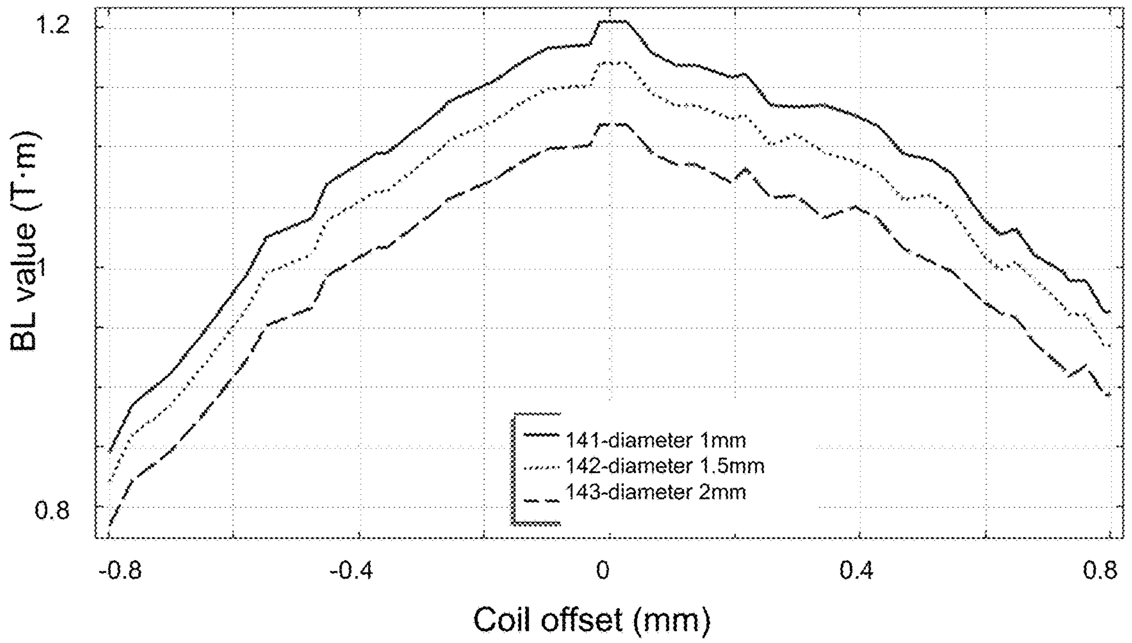
FIG. 14A is a comparison diagram illustrating BL value curves when a second hole has different diameters according to some embodiments of the present disclosure.

FIG. 13 is a comparison diagram illustrating frequency response curves when the second hole 1234*a* has different diameters according to some embodiments of the present disclosure. As shown in FIG. 13, curve 1311 represents a frequency response curve when the diameter of the second hole 1234*a* is 1 mm, curve 1312 represents a frequency response curve when the diameter of the second hole 1234*a* is 1.5 mm, and curve 1313 represents a frequency response curve when the diameter of the second hole 1234*a* is 2 mm. As the diameter of the second hole 1234*a* increases, the frequency response of the transducer 12 decreases accordingly, with a decrease of about 0.5 dB for every 0.5 mm increase in diameter. FIG. 14A is a comparison diagram illustrating BL value curves when the second hole 1234*a* has different diameters according to some embodiments of the present disclosure. As shown in FIG. 14A, curve 141 represents a BL value curve when the diameter of the second hole 1234*a* is 1 mm, curve 142 represents a BL value curve when the diameter of the second hole 1234*a* is 1.5 mm, and curve 143 represents a BL value curve when the diameter of the second hole 1234*a* is 2 mm. As the diameter of the second hole 1234*a* increases, the BL value decreases accordingly. Therefore, the larger the diameter of the second hole 1234*a* is, the smaller the frequency response and BL value is. However, due to the influence of processing accuracy and structural strength, the diameter of the second hole 1234*a* cannot be too small or too large. Therefore, to avoid the corresponding positioning pillar being too thin due to the small diameter of the second hole 1234*a*, which would lead to insufficient structural strength and excessive processing accuracy requirements, and to avoid reducing the frequency response and BL value due to an overly large diameter, the diameter of the second hole 1234*a* may be within a range of 1.5 mm-2.5 mm. For example, the diameter of the second hole 1234*a* may be within a range of 1.8 mm-2.3 mm. In some embodiments, to balance magnetic field strength and the sensitivity of the transducer 12, a ratio of the opening area of the second hole 1234*a* to the area of the magnetic conductor plate surface where the second hole is located is less than 36%.

In some embodiments, by setting a count of coils 124 along the radial direction of the transducer 12 as an even number, the inlet position and outlet position of the first coil 1241 or the second coil 1242 are located at the same position of the magnetic conductive cover 1232, enabling the inner wall of the magnetic conductive cover 1232 to fit tightly with the outer wall of the coil 124, thus reducing the mass of the transducer 12 (and subsequently reducing the mass of the loudspeaker 10). Furthermore, by shaping the coil 124 (the first coil 1241 and the second coil 1242) into an “elongated” form and selecting appropriate parameters for the coil 124, the inner diameter of the magnetic conductive cover 1232 may be reduced to reduce the mass of the transducer 12 (and subsequently reducing the mass of the loudspeaker 10). In some embodiments, the mass of the transducer 12 (and subsequently reducing the mass of the loudspeaker 10) may be reduced by setting a weight-reducing slot on the magnetic conductive cover 1232 or by drilling a hole in the magnet 1233 and/or the magnetic conductive plate (the first magnetic conductive plate 1234 and/or the second magnetic conductive plate 1235). In some embodiments, the mass m of the loudspeaker 10 after weight reduction may be within a range of 2 g-5 g. For example, the mass m of the loudspeaker 10 may be within a range of 3.8 g-4.5 g.

Figure 14B:
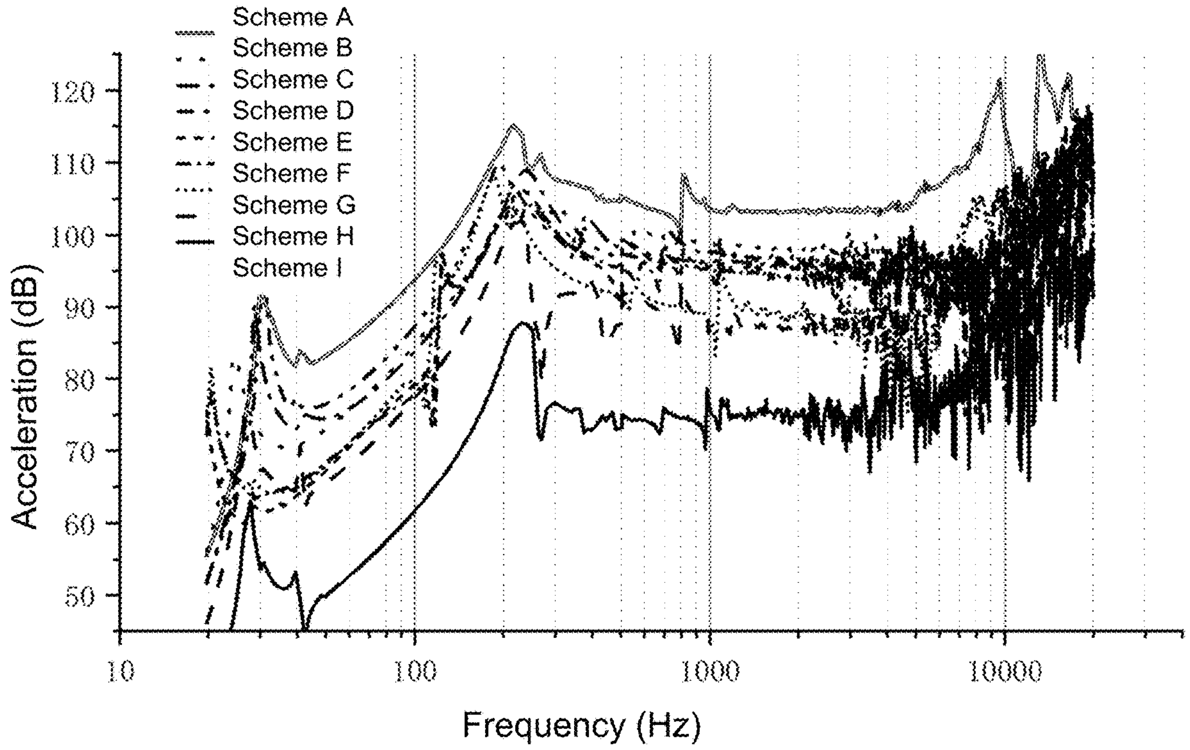
FIG. 14B is a comparison diagram illustrating acceleration curves of loudspeakers within a mass range of 2 g-5 g according to some embodiments of the present disclosure.
Figure 15A:
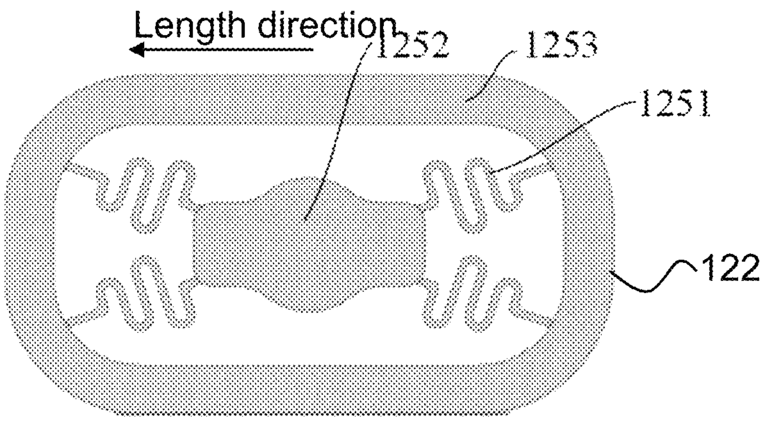
FIG. 15A is a schematic diagram illustrating a structure of a diaphragm according to some embodiments of the present disclosure.
Figure 15B:
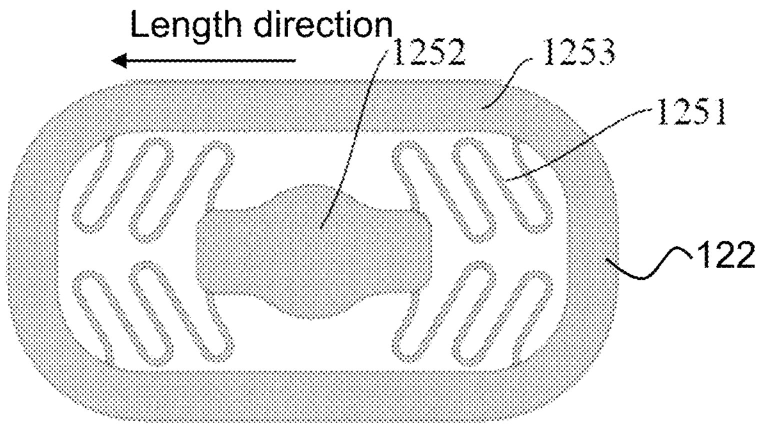
FIG. 15B is a schematic diagram illustrating a structure of a diaphragm according to some embodiments of the present disclosure.
Figure 15C:
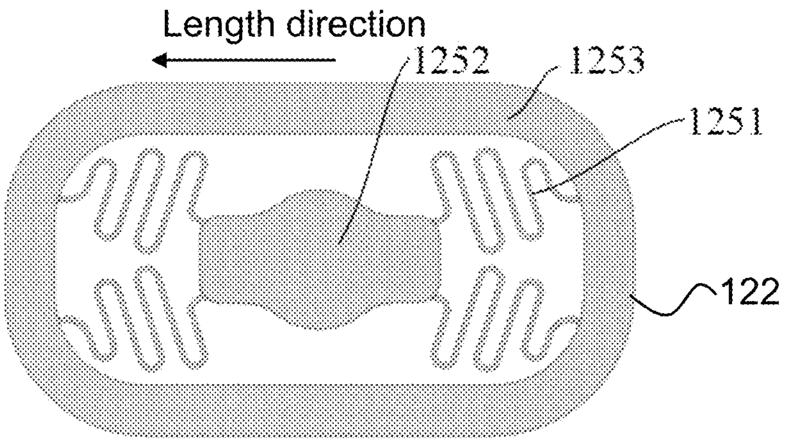
FIG. 15C is a schematic diagram illustrating a structure of a diaphragm according to some embodiments of the present disclosure.

FIG. 14B is a comparison diagram illustrating acceleration curves of the transducer 12 within a mass range of 2 g-5 g according to some embodiments of the present disclosure. Schemes A-I represent different embodiments where the mass of the transducer 12 is within a range of 2 g-5 g under different conditions such as different wire diameters of the coils (the first coil and the second coil), different counts of radial coil windings and axial layers, different products of radial coil windings and axial layers, different connection methods of coils in series or parallel, etc. As shown in FIG. 14B, after weight reduction (with the mass of the transducer 12 within a range of 2 g-5 g) according to some embodiments of the present disclosure, the transducer 12 under the excitation of a test voltage has an acceleration range of 70 dB-110 dB at 1 kHz. The measurement method of the acceleration curve shown in FIG. 14B includes: under a test voltage, exciting the transducer 12 shown in the embodiments of the present disclosure to generate vibration, measuring the displacement generated by the transducer 12 driving the vibration panel 13 through laser testing, normalizing the displacement through data processing (e.g., dividing the displacement in the corresponding frequency band by the corresponding test voltage), and comparing the normalized displacement with 1 mm/$s^2$ to obtain the acceleration dB value. In some embodiments, by adjusting to an appropriate acceleration range, the sensitivity of the transducer 12 may be improved, thus achieving the purpose of improving the sound quality of the loudspeaker 10. Even though the amplitude of the BL value curve decreases after weight reduction, the frequency response acceleration is improved. The acceleration curve shown in FIG. 14B is obtained by measuring the vibration acceleration of the vibration panel 13 with the fixing component 20 fixed.

Figure 16A:
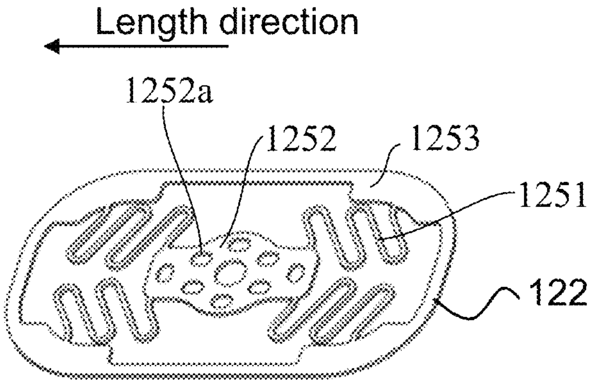
FIG. 16A is a schematic diagram illustrating a structure of a diaphragm according to some embodiments of the present disclosure.
Figure 16B:
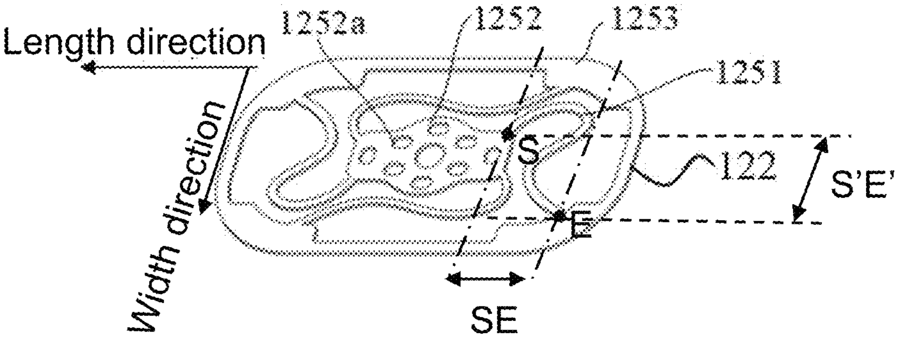
FIG. 16B is a schematic diagram illustrating a structure of a diaphragm according to some embodiments of the present disclosure.

In some embodiments, the vibration plate 122 may be connected between the magnetic conductive cover 1232 and the magnet assembly 1231 to elastically support the magnet assembly 1231. In some embodiments, the vibration plate 122 may include a first vibration plate 125 and a second vibration plate 126. As shown in FIG. 7A, the first vibration plate 125 or the second vibration plate 126 (hereinafter referred to as the vibration plate 122) may include an edge region 1253, a central region 1252, and multiple support rods 1251 connecting the edge region 1253 and the central region 1252. In some embodiments, the central region 1252 of the vibration plate 122 (e.g., the first vibration plate 125 or the second vibration plate 126) may be connected to the magnet assembly 1231. For example, the central region 1252 of the first vibration plate 125 is connected to the first magnetic conductive plate 1234 of the magnet assembly 1231, and the central region 1262 of the second vibration plate 126 is connected to the second magnetic conductive plate 1235 of the magnet assembly 1231. In some embodiments, the central region 1252 may be provided with a through hole (as shown in FIGS. 16A-16B), and a protruding column may be provided on the side of the magnetic conductive plate facing the central region 1252, thereby achieving connection and fixation through the cooperation of the protruding column and the through hole. In some embodiments, the protruding column may be a hot-melt column, which may fix the central region 1252 on the magnetic conductive plate by melting and deforming after being inserted into the through hole. In some embodiments, an outer contour of the edge region 1253 of the vibration plate may be a racetrack shape, or the outer contour of the edge region 1253 may be rectangular, elliptical, or circular, etc. Compared to using a single vibration plate, double vibration plates (i.e., the vibration plate 122 includes the first vibration plate 125 and the second vibration plate 126) may significantly increase a count of failure cycles, and by the elastic support of the first vibration plate 125 and the second vibration plate 126 for the magnet assembly 1231, a shaking amplitude of movable parts in the transducer 12 is reduced.

In some embodiments, the multiple support rods 1251 of the vibration plate 122 may adopt a zigzag bending structure to give the vibration plate a preset elastic coefficient. FIGS. 15A-15C and 16A-16B are structural diagrams illustrating the vibration plate 122 according to some embodiments of the present disclosure. FIGS. 15A-15C and 16A-16B show multiple implementations of the vibration plate and also show multiple implementations of the support rods. In some embodiments, the support rods 1251 of the vibration plate may adopt multiple bending structures as shown in FIGS. 15A-15C and 16A-16B, and are connected to the edge region 1253 and the central region 1252 at both ends, respectively, to give the vibration plate a preset elastic coefficient and prevent or reduce the rotation and/or swinging motion between the coil and the movable parts of the magnetic circuit system 123.

In some embodiments, referring to FIGS. 16A and 16B, a through-hole 1252*a* is provided on the central region 1252 of the vibration plate 122 for inserting a protruding column set on the magnetic conductive plate (the first magnetic conductive plate 1234 or the second magnetic conductive plate 1235), thereby achieving connection and fixation through the cooperation of the protruding column and the through-hole 1252*a*. Exemplary connection methods may include hot melt, bolts, etc.

To resist the magnetic attraction force of the magnet assembly 1231 and prevent magnet offset in the transducer 12, the stiffness of the vibration plate 122 in any direction (hereinafter referred to as the radial direction) within the plane perpendicular to the vibration direction may be greater than a stiffness threshold. For example, the equivalent stiffness in the radial direction of the vibration plate 122 may be greater than $4.7\times10^4$ N/m based on the width of the magnetic gap A1 and the magnetic attraction force between the magnet assembly 1231 and the magnetic conductive cover 1232. As another example, the equivalent stiffness in the radial direction of the vibration plate 122 may be greater than $6.4\times10^4$ N/m. By optimizing the stiffness in the length and width directions of the elastic vibration plate 122 within the plane perpendicular to the vibration direction, it may resist the magnetic attraction force of the magnet assembly 1231, thus preventing magnet offset in the transducer 12, which means preventing collisions between the coil and movable parts of the magnetic circuit system 123.

It should be noted that the transducer 12 provided in the present disclosure may include at least one vibration plate, and the at least one vibration transmission plate is connected between the magnet assembly 1231 and the magnetic conductive cover 1232. The equivalent stiffness in the radial direction of the at least one vibration plate is greater than $4.7\times10^4$ N/m. For example, the transducer 12 may only include at least one vibration plate 122. As another example, the transducer 12 may only include at least two vibration plates 122, namely a first vibration plate 125 and a second vibration plate 126. The equivalent stiffness in the radial direction of each of the first vibration plate 125 and the second vibration plate 126 may be greater than $4.7\times10^4$ N/m.

In some embodiments, dimensional data of the vibration plate 122 may be determined based on the requirements for its equivalent stiffness in the radial direction. In some embodiments, a ratio of a distance between a starting point and an ending point of the support rod 1251 along the length direction of the vibration plate 122 to a length of the support rod 1251 itself may be within a range of 0-1.2. The distance between the starting point and the ending point of the support rod 1251 along the length direction of the vibration plate 122 refers to a distance along the length direction of the vibration plate 122 between a connection point of the support rod 1251 with the central region 1252 of the vibration plate and a connection point of the support rod 1251 with the edge region 1253 of the vibration plate. For example, as shown in FIG. 16B, the ratio of a distance SE between a starting point S and an ending point E of the support rod 1251 along the length direction of the vibration plate 122 to the total length of the curved support rod 1251 may be within a range of 0.7-0.85. In some embodiments, the ratio of the distance between the starting point and the ending point of the support rod 1251 along a width direction of the vibration plate 122 to the length of the support rod 1251 may be within a range of 0-0.5. The distance between the starting point and the ending point of the support rod 1251 along the width direction of the vibration plate 122 refers to a distance along the width direction of the vibration plate 122 between the connection point of the support rod 1251 with the central region 1252 of the vibration plate and the connection point of the support rod 1251 with the edge region 1253 of the vibration plate. For example, as shown in FIG. 16B, the ratio of a distance S'E' between the starting point S and the ending point E of the support rod 1251 along the width direction of the vibration plate 122 to the total length of the curved support rod 1251 may be within a range of 0.15-0.35.

In some embodiments, the length of the support rod 1251 may be within a range of 7 mm-25 mm. In some embodiments, a thickness of the support rod along the axial direction of the transducer 12 (i.e., the thickness of the vibration plate) may be within a range of 0.1 mm-0.2 mm. In some embodiments, a ratio range of the thickness of the vibration plate along the axial direction of the transducer 12 to the width of any support rod 1251 along a radial plane of the transducer 12 may be within a range of 0.16-0.75. Exemplary ratio ranges of thickness to width may include: 0.2-0.7, 0.26-0.65, 0.3-0.6, 0.36-0.55, or 0.4-0.5, etc. In some embodiments, the thickness of the first vibration plate 125 may be within a range of 0.1 mm-0.2 mm, and a width range of the support rod 1251 may be within a range of 0.25 mm-0.5 mm. For example, a thickness range of the first vibration plate 125 may be within a range of 0.1 mm-0.15 mm, and a width range of the support rod 1251 may be within a range of 0.4 mm-0.48 mm.

In some embodiments, the loudspeaker 10 may include an air-conduction loudspeaker and a bone-conduction loudspeaker (e.g., as shown in FIG. 4 or FIG. 5A). In some embodiments, a crossover point of the bone conduction and the air conduction may be in a low-to-mid frequency range (e.g., within a range of 400 Hz-500 Hz). Sounds above the crossover point are produced by the bone-conduction loudspeaker, and sounds below the crossover point are produced by the air-conduction loudspeaker, which may prevent the bone-conduction loudspeaker from vibrating at low frequencies and causing users to feel significant vibrations. Additionally, since the bone-conduction loudspeaker has a relatively flat frequency response curve after a certain distance from its resonance peak frequency, the output distortion of the corresponding frequency band is small. Therefore, the resonance peak frequency of the bone-conduction loudspeaker may be set below the crossover point. There may be a certain distance between the resonance peak frequency and the crossover point. In some embodiments, the resonance peak frequency of the transducer 12 may be less than 300 Hz.

In some embodiments, to make the resonance peak frequency of the transducer 12 less than 300 Hz, a ratio range of a total axial (parallel to the vibration direction) elastic coefficient k of the vibration plate 122 to the mass m of the transducer 12 may be set as: $k/m<(2\pi\cdot 300)^2\approx 3.6\times 10^6\ Hz^2$. In some embodiments, the mass of the transducer 12 may include the sum of the masses of the magnetic conductive cover 1232, the coil 124, and the housing 11, or the sum of the masses of the air-conduction loudspeaker 16, the magnetic conductive cover 1232, the coil 124, and the housing 11. The unit of the elastic coefficient k is N/m (Newton per meter), and the unit of the mass m is g (gram).

In some embodiments, to reduce the overall size and mass of the device and improve sound quality, the mass m of the transducer 12 may be within a range of 2 g to 5 g. For example, the mass of the transducer 12 may be within a range of 2.2 g to 4.8 g. As another example, the mass of the transducer 12 may be within a range of 3.8 g to 4.5 g.

In some embodiments, based on the mass range of the transducer 12 and the ratio range of the total axial elastic coefficient k of the vibration plate 122 to the mass m of the transducer 12, the total axial elastic coefficient k of the vibration plate 122 may be determined to be less than 18000 N/m. In some embodiments, the vibration plate 122 includes a parallel connection of the first vibration plate 125 and the second vibration plate 126 as shown in FIG. 4. In some embodiments, the axial elastic coefficients k0 of the first vibration plate 125 and the second vibration plate 126 may be the same, and the axial elastic coefficient k0 of each vibration plate may be less than 9000 N/m. In some embodiments, the axial elastic coefficients k0 of the first vibration plate 125 and the second vibration plate 126 may be different, but the total axial elastic coefficient k provided by the first vibration plate 125 and the second vibration plate 126 is less than 18000 N/m.

Therefore, by adjusting the mass range of the mass block connected by the double vibration plates consisting of the first vibration plate 125 and the second vibration plate 126, and/or adjusting the elastic coefficients of the double vibration plates, the bone-conduction resonance peak frequency may be achieved at no more than 300 Hz. It should be noted here that the mass of the mass block refers to the mass of all components that need to be driven by the double vibration plates. For example, in the embodiment shown in FIG. 2A, the mass of the mass block is a total mass of the coil 124, the magnetic shield 1232, the bracket 121, the vibration panel 13, and the damping plate 14. As another example, in the embodiment shown in FIG. 3, the mass of the mass block is a total mass of the coil 124, the magnetic conductive cover 1232, the vibration panel 13, and the housing 11. In addition, in the embodiment of the bone-air-conduction loudspeaker, the mass of the mass block also includes the mass of the air-conduction loudspeaker. In some embodiments, the mass of the mass block may also include the mass of other necessary connecting components.

Therefore, by adjusting the mass range of the mass block connected by the double vibration plates consisting of the first vibration plate 125 and the second vibration plate 126 and/or the elastic coefficients of the double vibration plates, the bone-conduction resonance peak frequency may be achieved at no more than 300 Hz. It should be noted here that the mass of the mass block refers to the mass of all components that need to be driven by the double vibration plates. For example, in the embodiment shown in FIG. 2A, the mass of the mass block is an overall mass of the coil 124, the magnetic conductive cover 1232, the bracket 121, the vibration panel 13, and the damping plate 14. As another example, in the embodiment shown in FIG. 3, the mass of the mass block is an overall mass of the coil 124, the magnetic conductive cover 1232, the vibration panel 13, and the housing 11. In addition, in the embodiment of the bone-air-conduction loudspeaker, the mass of the mass block also includes the mass of the air-conduction loudspeaker. Furthermore, the mass of the mass block may also include the mass of other necessary connecting components.

FIGS. 17A to 17G are schematic diagrams illustrating a structure of the magnetic circuit system 123 in the form of a Halbach Array according to some embodiments of the present disclosure. It should be noted that FIGS. 17A to 17G show the central cross-section of the magnetic circuit system 123 and are the right halves of two-dimensional axially symmetric figures. Combining FIGS. 4, 6, and 17A to 17G, the transducer 12 may include the magnetic circuit system 123 and the coil 124. The magnetic circuit system 123 may include a magnet assembly 1231 and a magnetic conductive cover 1232. The coil 124 may be wounded around the outside of the magnet assembly 1231 parallel to the axis of the vibration direction, and the magnetic conductive cover 1232 may be wounded around the outside of the coil 124 along the axis. In some embodiments, at least one of the magnets 1233 included in the magnet assembly 1231, the magnetic conductive plate, or the magnetic conductive cover 1232 may include multiple magnetic parts with different magnetization directions. In some embodiments, the magnet assembly 1231 and/or the magnetic conductive cover 1232 may include multiple magnetic parts (e.g., magnets) with different magnetization directions. The multiple magnetic parts with different magnetization directions may form a Halbach Array (e.g., as shown in FIGS. 17A to 17G). Through a specific array arrangement, the magnetic field may be concentrated on one side of the magnetic component 1231, thereby enhancing the magnetic field strength at the coil 124.

Figure 17A:
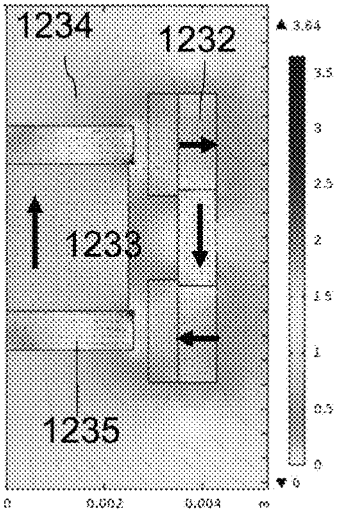
FIG. 17A is a schematic diagram illustrating a structure of a magnetic circuit system in a form of a Halbach Array according to some embodiments of the present disclosure.
Figure 17B:
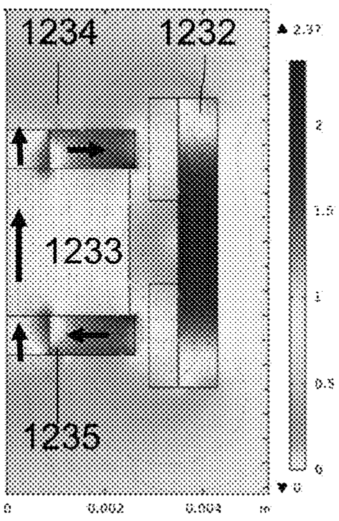
FIG. 17B is a schematic diagram illustrating a structure of a magnetic circuit system in a form of a Halbach Array according to some embodiments of the present disclosure.
Figure 17C:
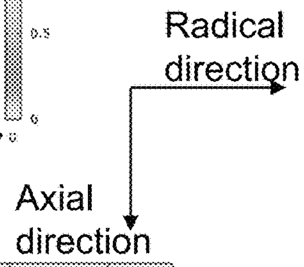
FIG. 17C is a schematic diagram illustrating a structure of a magnetic circuit system in a form of a Halbach Array according to some embodiments of the present disclosure.
Figure 17C:
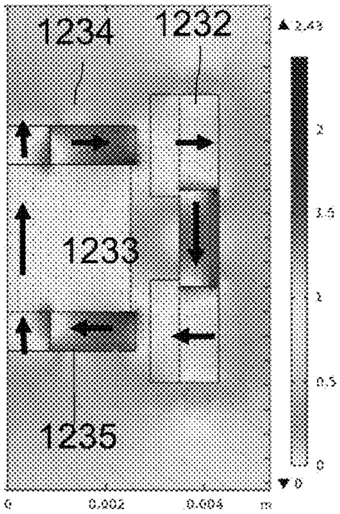
Figure 17D:
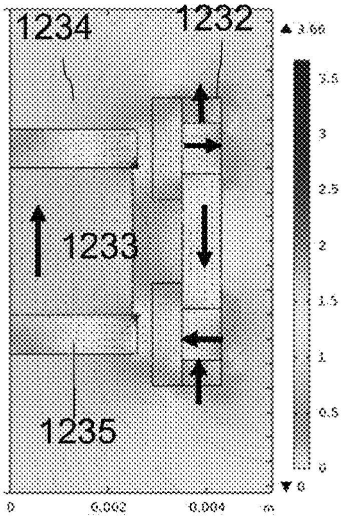
FIG. 17D is a schematic diagram illustrating a structure of a magnetic circuit system in a form of a Halbach Array according to some embodiments of the present disclosure.
Figure 17E:
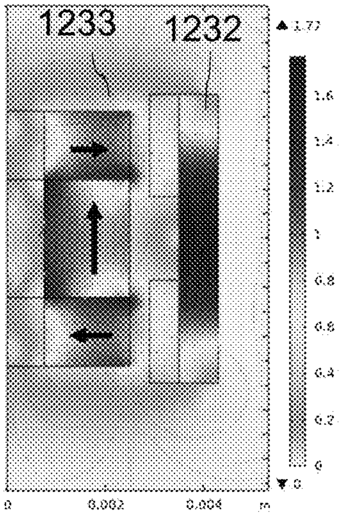
FIG. 17E is a schematic diagram illustrating a structure of a magnetic circuit system in a form of a Halbach Array according to some embodiments of the present disclosure.
Figure 17F:
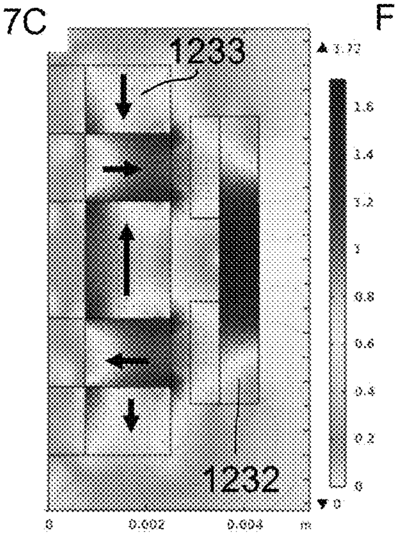
FIG. 17F is a schematic diagram illustrating a structure of a magnetic circuit system in a form of a Halbach Array according to some embodiments of the present disclosure.
Figure 17G:
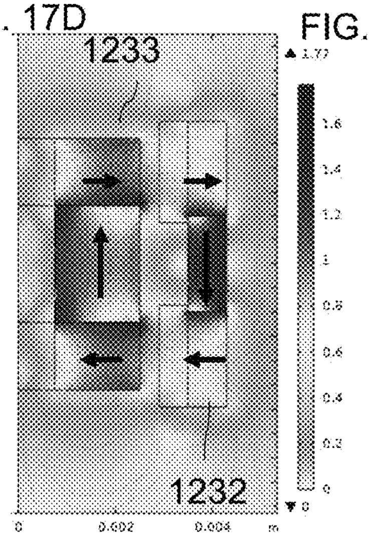
FIG. 17G is a schematic diagram illustrating a structure of a magnetic circuit system in a form of a Halbach Array according to some embodiments of the present disclosure.

In some embodiments, the magnet 1233, the magnetic conductive plate, or the magnetic conductive cover 1232 may have arrays composed of multiple magnetic parts with different magnetization directions. In some embodiments, the magnetization directions of the multiple magnetic parts rotate clockwise or counterclockwise on a surface parallel to the vibration direction of the transducer 12. As shown in FIG. 17A, there may be no magnetic part arrays in the magnet 1233 and the magnetic conductive plate (the first magnetic conductive plate 1234 and/or the second magnetic conductive plate 1235), while the magnetic conductive cover 1232 may include three layers of magnetic parts arranged axially, with the magnetization directions of these layers being radially outward, axially downward, and radially inward from top to bottom. As shown in FIG. 17B, there may be no magnetic part arrays in the magnetic conductive cover 1232 and the magnet 1233, while the magnetic conductive plate (the first magnetic conductive plate 1234 and/or the second magnetic conductive plate 1235) may include four magnetic parts arranged radially, with the two magnetic parts in the uppermost layer and the two magnetic parts in the lowermost layer each including two magnetic parts arranged radially. The magnetization directions of the two magnetic parts in the uppermost layer are axially upward and radially outward from left to right, while the magnetization directions of the two magnetic parts in the lowermost layer are axially upward and radially inward from left to right. In some embodiments, both the magnetic conductive plate (the first magnetic conductive plate 1234 and/or the second magnetic conductive plate 1235) and the magnetic conductive cover 1232 may have magnetic part arrays. As shown in FIG. 17C, the magnetic part array of the magnetic conductive plate is similar to that shown in FIG. 17B, while the magnetic part array of the magnetic conductive cover 1232 is similar to that shown in FIG. 17A. In some embodiments, compared to the three-layer magnetic part array, the magnet 1233, the magnetic conductive plate, and/or the magnetic conductive cover 1232 may have more magnetic part arrays. As shown in FIG. 17D, there may be no magnetic part arrays in the magnet 1233 and the magnetic conductive plate (the first magnetic conductive plate 1234 and/or the second magnetic conductive plate 1235), while the magnetic conductive cover 1232 may include five layers of magnetic parts arranged axially, with the magnetization directions of these layers being axially upward, radially outward, axially downward, radially inward, and axially upward from top to bottom. In some embodiments, the magnet 1233 may be a hollow ring structure. As shown in FIG. 17E, the magnet 1233 may include three layers of magnetic sections arranged axially, with the magnetization directions of these layers being radially outward, axially upward, and radially inward from top to bottom. As shown in FIG. 17F, the magnets 1233 can include five layers of magnetic parts arranged axially, with the magnetization directions of these layers being axially downward, radially outward, axially upward, radially inward, and axially downward from top to bottom. As shown in FIG. 17G, the magnet 1233 may include three layers of magnetic parts arranged axially, with the magnetization directions of these layers being radially outward, axially upward, and radially inward from top to bottom, while the magnetic conductive cover 1232 may include three layers of magnetic parts arranged axially, with the magnetization directions of these layers being radially outward, axially downward, and radially inward from top to bottom. In some embodiments, the magnetization directions of at least two adjacent magnetic parts in the multiple magnetic parts may be perpendicular to each other.

Figure 18:
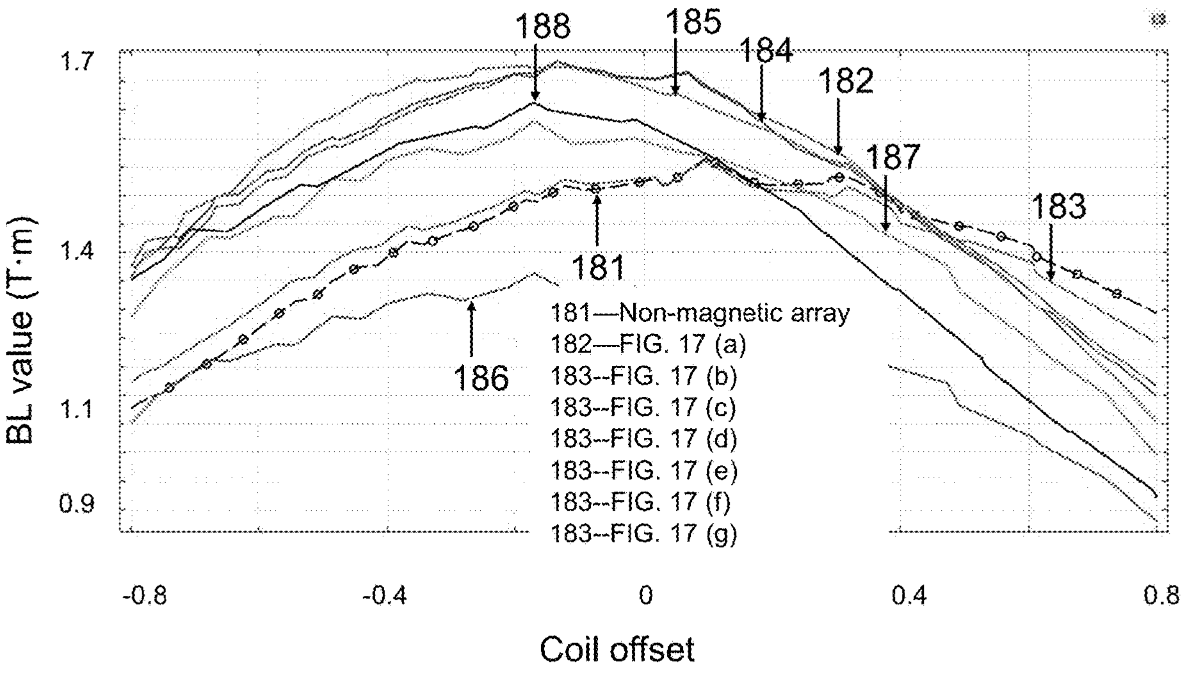
FIG. 18 is a comparison diagram illustrating BL value curves of magnetic circuit systems with different magnetic arrays according to some embodiments of the present disclosure.

FIG. 18 is a comparison diagram illustrating BL value curves of the magnetic circuit system 123 with different magnetic arrays according to some embodiments of the present disclosure. In FIG. 18, curve 181 represents a BL value curve of the magnetic circuit system 123 without a magnetic segment array, while curves 182-188 represent BL value curves of magnetic circuit system 123 with magnetic segment arrays as shown in FIGS. 17A to 17G, respectively. As can be seen from FIG. 18, compared to not having a magnetic segment array, the magnetic flux density is increased when the magnetic conductive cover and/or the magnet assembly have a magnetic segment array. The increase in magnetic flux density is significant when the magnetic conductive cover has a magnetic segment array, with an approximate 12% increase. By configuring the magnet 1233 as a hollow ring-shaped magnetic segment array, the magnetic flux density still has an approximate 6% increase compared to not having a magnetic segment array.

The potential beneficial effects of the embodiments described in the present disclosure include, but are not limited to: (1) by setting a count of coils 124 along the radial direction of the transducer 12 as an even number, the inlet position and the outlet position of the first coil 1241 or the second coil 1242 are located at the same position of the magnetic conductive cover 1232, thereby allowing the inner wall of the magnetic conductive cover 1232 to fit with the outer wall of the coil 124, and reducing the mass of the transducer 12 (and subsequently reducing the mass of the loudspeaker 10); (2) by shaping the coil 124 (first coil 1241 and second coil 1242) into a "slender" form and selecting suitable parameters for the coil 124, the inner diameter of the magnetic conductive cover 1232 may be reduced, further reducing the mass of the transducer 12 (and subsequently reducing the mass of the loudspeaker 10); (3) by setting a weight-reducing slot on the magnetic conductive cover 1232 or by drilling a hole in the magnet 1233 and/or the magnetic conductive plate (the first magnetic conductive plate 1234 and/or the second magnetic conductive plate 1235), the mass of the transducer 12 may be reduced (and subsequently reducing the mass of the loudspeaker 10); (4) by adjusting the total axial elastic coefficient of the loudspeaker 10 and the vibration plate 122, the bone-conduction resonance peak frequency may be kept below 300 Hz, thereby preventing the bone-conduction loudspeaker from vibrating at low frequencies and causing users to feel significant vibrations; (5) by setting the stiffness of the vibrating plate 122 in any direction (radial direction) perpendicular to the vibration direction, it may resist the magnetic attraction of the magnet assembly 1231, thereby preventing magnet offset in the transducer 12; (6) by setting the ratio of the thickness of the magnetic conductive plate to the thickness of the magnet 1233, the magnetic field intensity may be increased while avoiding magnetic saturation, thereby enhancing the sensitivity of the loudspeaker 10; (7) by setting magnetic segment arrays with different magnetization directions in at least one of the magnet 1233, the magnetic conductive plate, and/or the magnetic conductive cover 1232, the magnetic field intensity may be improved, thereby further enhancing the sensitivity of the loudspeaker 10; (8) by adopting a dual-coil configuration (the first coil 1241 and the second coil 1242), dual drive is achieved, and the high-frequency impedance of the coils is reduced, thus improving the sensitivity of the transducer 12; (9) by fixing double vibration plates (i.e., the vibration plate 122 includes a first vibration plate 125 and a second vibration plate 126) on both sides of the magnet 1233, it ensures high-sensitivity output while maintaining stable vibration of the magnet 1233 through the support of the double vibration plates; (10) the coil 124 is attached to the magnetic conductive cover 1232, making the magnetic gap between the magnetic conductive cover 1232 and the coil 124 smaller, thus concentrating the magnetic field and improving the sensitivity of the transducer 12.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A transducer, comprising:

a magnetic circuit system including a magnet assembly and a magnetic conductive cover, the magnetic conductive cover being arranged at least partially around the magnet assembly; and a vibration plate, including a first vibration plate and a second vibration plate, the first vibration plate and the second vibration plate being respectively distributed on both sides of the magnet assembly along a vibration direction of the magnet assembly, and being configured to elastically support the magnet assembly, wherein an equivalent stiffness of the first vibration plate or the second vibration plate in any direction perpendicular to the vibration direction of the magnet assembly is greater than $4.7\times10^4$ N/m.

2. The transducer of claim 1, wherein the equivalent stiffness of the vibration plate in any direction perpendicular to the vibration direction of the magnet assembly is greater than $6.4\times10^4$ N/m.

3. The transducer of claim 1, wherein the first vibration plate or the second vibration plate includes: an edge region, a central region, and multiple support rods connecting the edge region to the central region, wherein the central region is connected to the magnet assembly.

4. The transducer of claim 3, wherein for one of the multiple support rods, a ratio of a distance between a starting point and an ending point of the support rod to a length of the support rod along a length direction of the first vibration plate or the second vibration plate is within a range of 0-1.2.

5. The transducer of claim 3, wherein one of the multiple support rods satisfies at least one of:

a length of the support rod is within a range of 7 mm-25 mm;

a thickness of the support rod is within a range of 0.1 mm-0.2 mm;

a width of the support rod is within a range of 0.25 mm-0.5 mm; or a ratio of the thickness of the vibration plate where the support rod is located to the width of the support rod is within a range of 0.16-0.75.

6. The transducer of claim 1, wherein the magnet assembly includes a magnet, a first magnetically conductive plate, and a second magnetically conductive plate fixed on both sides of the magnet along the vibration direction of the magnet assembly, wherein a central region of the first vibration plate is connected to the first magnetically conductive plate, and a central region of the second vibration plate is connected to the second magnetically conductive plate.

7. The transducer of claim 6, wherein an edge region of the first vibration plate is connected to one end of the magnetic conductive cover along the vibration direction of the magnet assembly, and the edge region of the second vibration plate is connected to the other end of the magnetic conductive cover along the vibration direction of the magnet assembly, wherein the first vibration plate and the second vibration plate form an elastic support for the magnet assembly.

8. The transducer of claim 6, wherein a ratio of a thickness of the magnetically conductive plate to a thickness of the magnet is within a range of 0.05-0.35.

9. The transducer of claim 1, wherein a total axial elastic coefficient of the vibration plate is less than 18000 N/m.

10. The transducer of claim 9, wherein an axial elastic coefficient of the first vibration plate or the second vibration plate is less than 9000 N/m.

11. The transducer of claim 1, further comprising a coil arranged in the magnetic circuit system, wherein a magnetic gap between the coil and the magnet assembly is within a range of 0.25 mm-0.35 mm.

12. The transducer of claim 1, wherein a resonance peak frequency of the transducer is less than 300 Hz.

13. The transducer of claim 1, further comprising a coil arranged in the magnetic circuit system, wherein the magnetic conductive cover is disposed outside the coil, and an inner wall of the magnetic conductive cover fits against an outer wall of the coil.

14. The transducer of claim 13, wherein a count of coil windings along a radial direction of the transducer is an even number, so that an inlet position and an outlet position of the coil are located at a same position of the magnetic conductive cover.

15. The transducer of claim 14, wherein the inlet position and the outlet position of the coil are located at a middle position of the magnetic conductive cover.

16. The transducer of claim 13, wherein the coil includes a first coil and a second coil arranged in the magnetic circuit system, wherein a ratio of an axial height to a radial width of the first coil or the second coil is not less than 3.5.

17. The transducer of claim 16, wherein an overall DC impedance of the coil is within a range of 6Ω-10Ω.

18. A loudspeaker, comprising a housing, an electronic component, and a transducer, wherein the housing forms a cavity accommodating the transducer and the electronic component, and the transducer includes:

a magnetic circuit system including a magnet assembly and a magnetic conductive cover, the magnetic conductive cover being arranged at least partially around the magnet assembly; and a vibration plate, including a first vibration plate and a second vibration plate, the first vibration plate and the second vibration plate being respectively distributed on both sides of the magnet assembly along a vibration direction of the magnet assembly, and being configured to elastically support the magnet assembly, wherein an equivalent stiffness of the first vibration plate or the second vibration plate in any direction perpendicular to the vibration direction of the magnet assembly is greater than $4.7\times10^4$ N/m.

19. The loudspeaker of claim 18, wherein the electronic component includes a vibration-sensitive element, the vibration-sensitive element being perpendicular to the vibration direction of the transducer.

20. An acoustic output device, comprising a fixing component and a loudspeaker, wherein the fixing component is connected to the loudspeaker, and the loudspeaker includes:

a housing, an electronic component, and a transducer, wherein the housing forms a cavity accommodating the transducer and the electronic component, and the transducer includes:

a magnetic circuit system including a magnet assembly and a magnetic conductive cover, the magnetic conductive cover being arranged at least partially around the magnet assembly; and a vibration plate, including a first vibration plate and a second vibration plate, the first vibration plate and the second vibration plate being respectively distributed on both sides of the magnet assembly along a vibration direction of the magnet assembly, and being configured to elastically support the magnet assembly, wherein an equivalent stiffness of the first vibration plate or the second vibration plate in any direction perpendicular to the vibration direction of the magnet assembly is greater than $4.7\times10^4$ N/m.

* * * * *